(12) United States Patent
Miyagawa et al.

(10) Patent No.: US 8,282,327 B2
(45) Date of Patent: Oct. 9, 2012

(54) FASTENING STRUCTURE

(75) Inventors: Takeshi Miyagawa, Toyokawa (JP); Hitoshi Nomasa, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 214 days.

(21) Appl. No.: 12/757,779

(22) Filed: Apr. 9, 2010

(65) Prior Publication Data
US 2010/0196119 A1   Aug. 5, 2010

Related U.S. Application Data

(63) Continuation of application No. PCT/JP2008/002870, filed on Oct. 10, 2008.

(30) Foreign Application Priority Data

Oct. 12, 2007 (JP) ................................. 2007-266937
Apr. 17, 2008 (JP) ................................. 2008-108103

(51) Int. Cl.
*F16B 37/14* (2006.01)
(52) U.S. Cl. .................... 411/372.6; 411/533; 411/999
(58) Field of Classification Search .............. 411/372.5, 411/372.6, 910, 533, 999
See application file for complete search history.

(56) References Cited

U.S. PATENT DOCUMENTS

| | | | |
|---|---|---|---|
| 1,887,557 A | 6/1931 | Keidel | |
| 3,561,075 A * | 2/1971 | Selinko | 24/704.1 |
| 4,036,692 A * | 7/1977 | Walton | 376/440 |
| 4,374,509 A | 2/1983 | Kawabata et al. | |
| 4,732,517 A * | 3/1988 | Crouch et al. | 411/39 |
| 4,930,959 A * | 6/1990 | Jagelid | 411/107 |
| 5,651,651 A * | 7/1997 | Spencer | 411/372.6 |
| 5,827,029 A * | 10/1998 | Denman | 411/373 |
| 5,879,117 A * | 3/1999 | Chen et al. | 411/373 |
| 5,988,966 A * | 11/1999 | Chen et al. | 411/372 |
| 6,146,070 A * | 11/2000 | Koma | 411/5 |
| 7,172,381 B2 * | 2/2007 | Miyazaki | 411/372.6 |

FOREIGN PATENT DOCUMENTS

JP   56-4667 A   1/1981

(Continued)

OTHER PUBLICATIONS

Extended European Search Report for corresponding EP Patent Application No. 08837618.1 dated Sep. 2, 2011.

*Primary Examiner* — Flemming Saether
(74) *Attorney, Agent, or Firm* — Sughrue Mion, PLLC

(57) ABSTRACT

An anti-theft fastening device for fastening an SBW motor externally mounted to a transmission case that includes a bolt having a head portion and a threaded portion integrally formed with the head portion, a bottomed tubular bolt cover having an opening end, and a cap member closing the opening end of the bolt cover. The bolt cover has a through bore to allow the threaded portion of the bolt to pass through, a bottom portion abutting a bottom surface of the head portion of the bolt, and a grip portion projecting from an outer circumference of the bottom portion and surrounding a periphery of the head portion of the bolt. When the threaded portion of the bolt is screwed into a threaded groove of the transmission case, the bottom portion of the bolt cover is interposed between the bottom surface of the head portion and each fastening portion of a bracket portion.

1 Claim, 20 Drawing Sheets

FOREIGN PATENT DOCUMENTS

| | | |
|---|---|---|
| JP | 5-460 Y2 | 2/1987 |
| JP | 7-35814 U | 7/1995 |
| JP | 09-004625 A | 1/1997 |
| JP | 11-117924 A | 4/1999 |
| JP | 2000-074211 A | 3/2000 |
| JP | 3692791 B2 | 3/2000 |
| JP | 2001-207705 A | 8/2001 |
| JP | 2002-339935 A | 11/2002 |
| JP | 2003-090173 A | 3/2003 |
| JP | 2003-232328 A | 8/2003 |
| JP | 2005-054993 A | 3/2005 |

\* cited by examiner

FIG.6
(a)
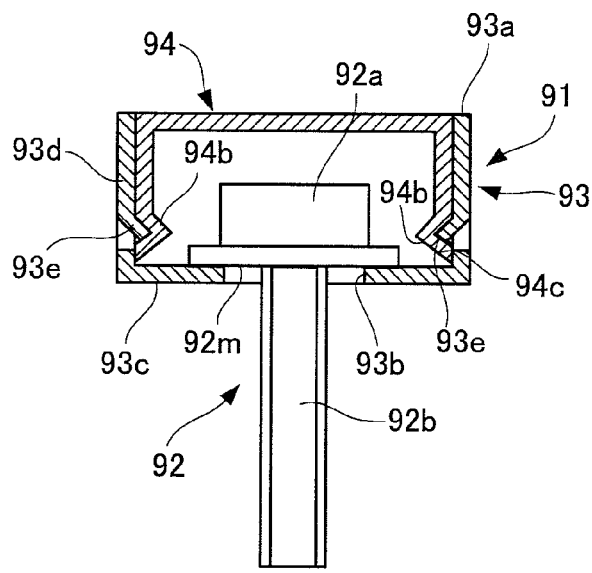
(b)
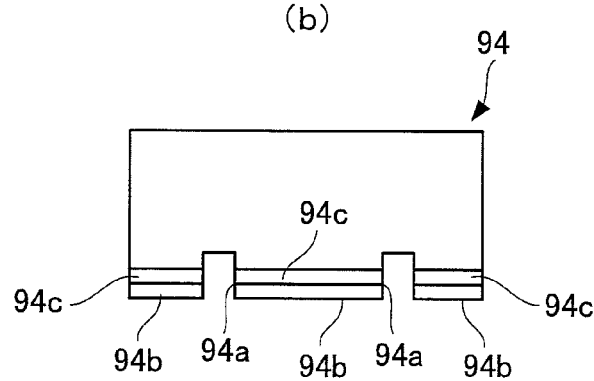
(c)
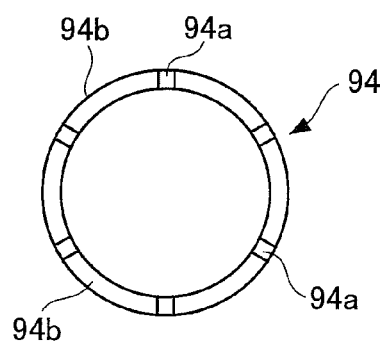

FIG.7
(a)
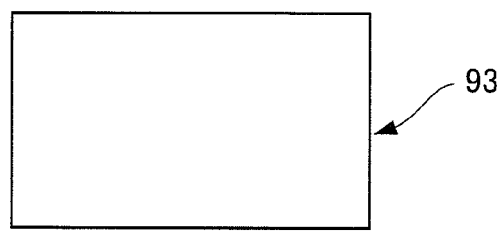
(b)
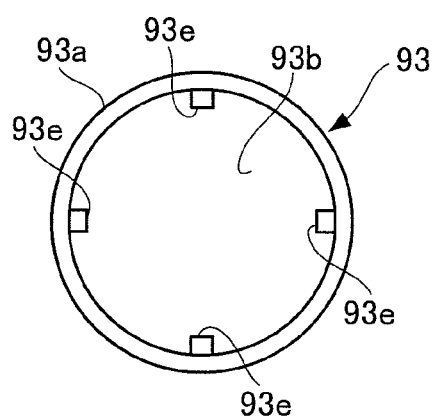
(c)
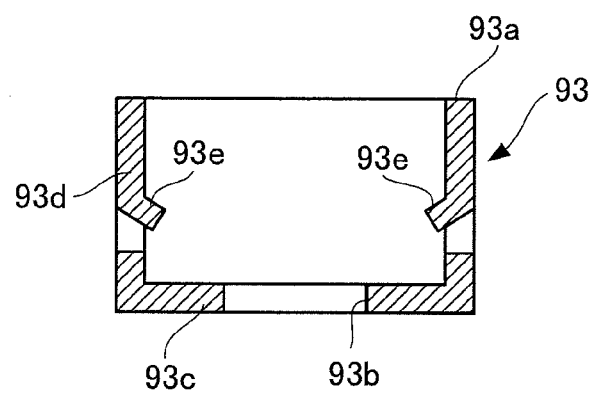

FIG.8
(a)
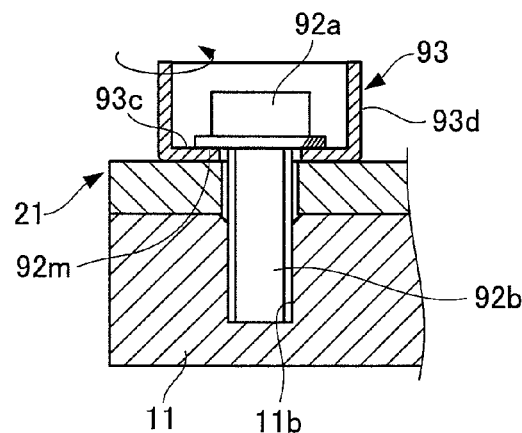
(b)
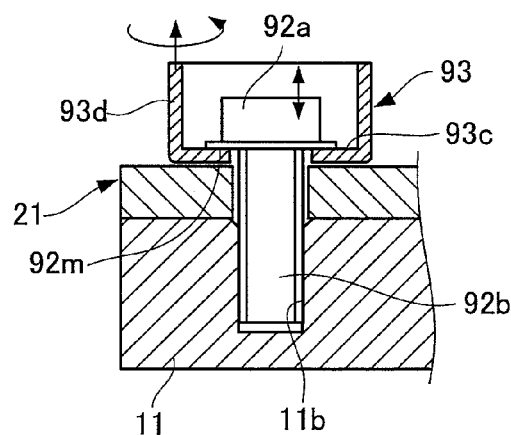
(c)
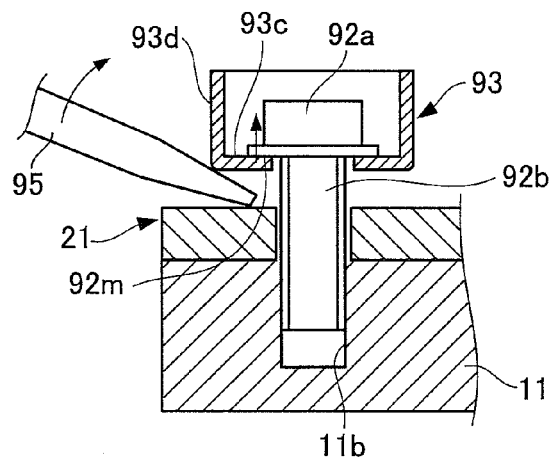

FIG.9
(a)
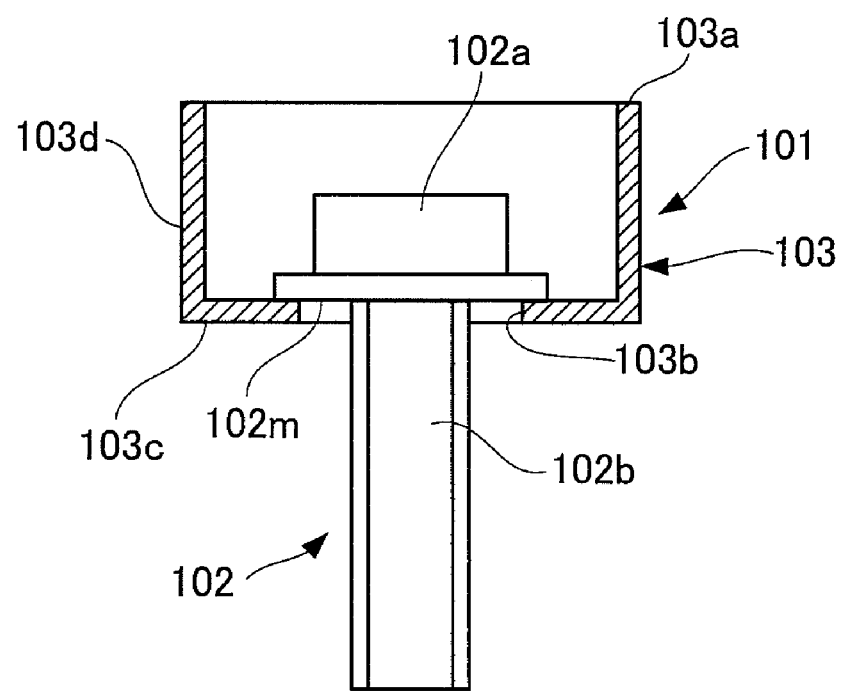
(b)
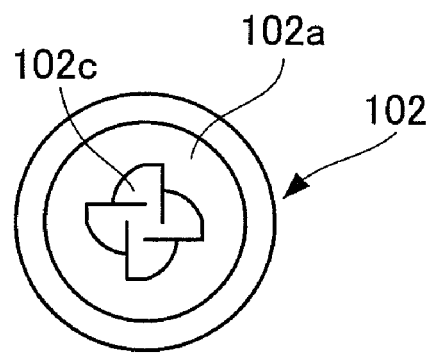

FIG.10
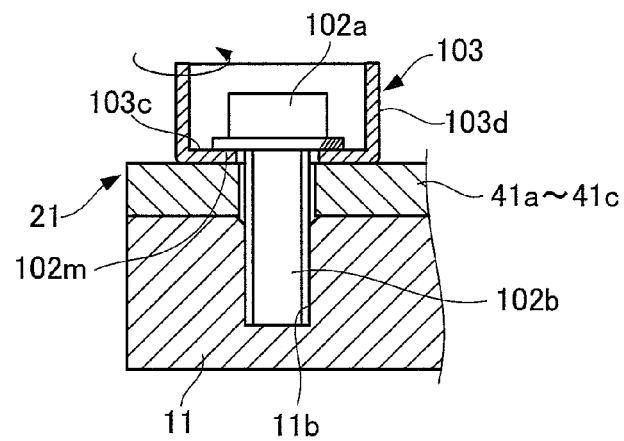
(a)
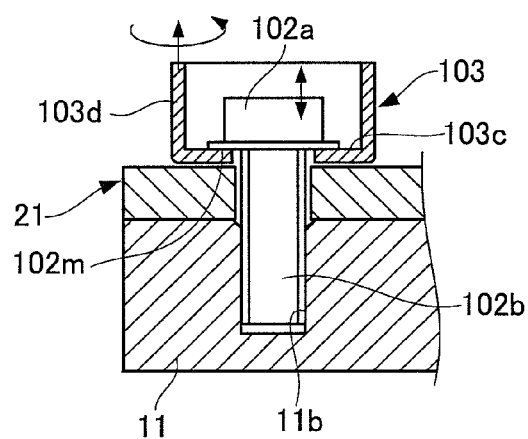
(b)
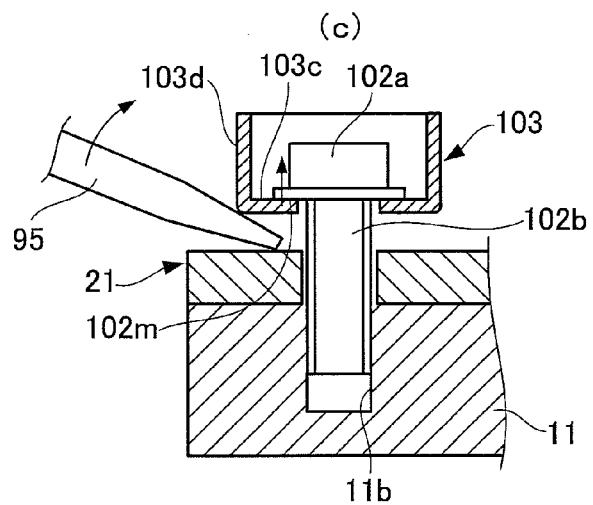
(c)

FIG.11
(a)
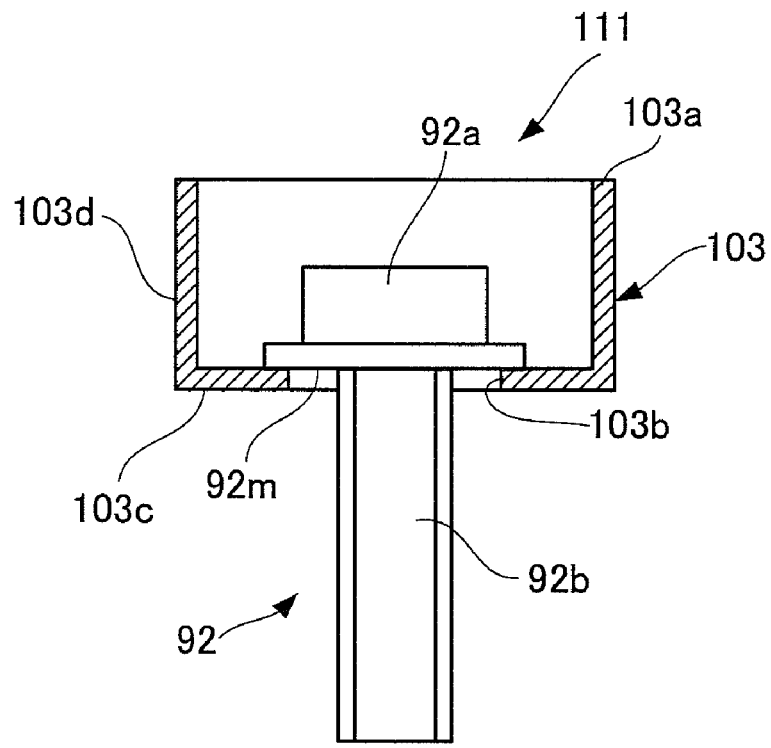
(b)
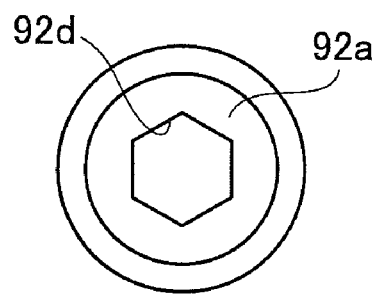

FIG.13
(a)
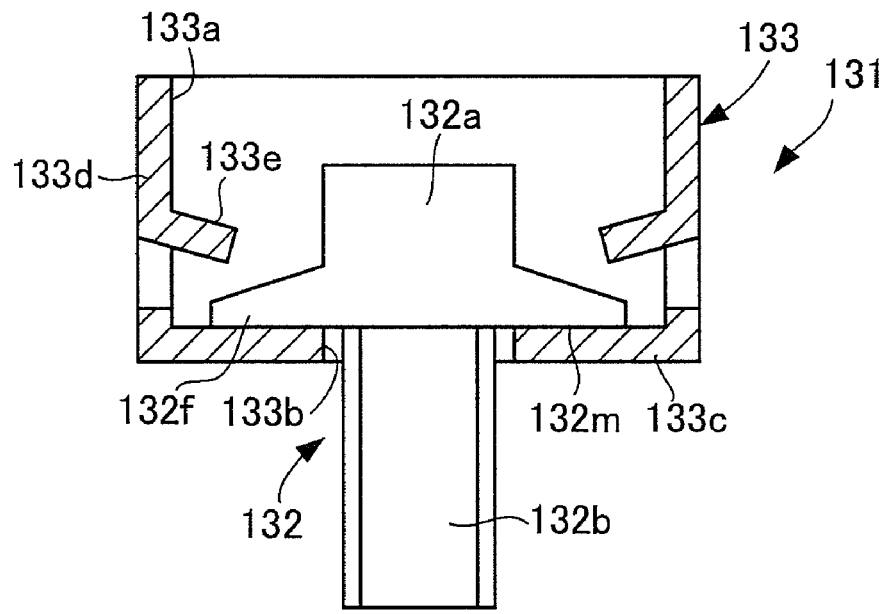
(b)
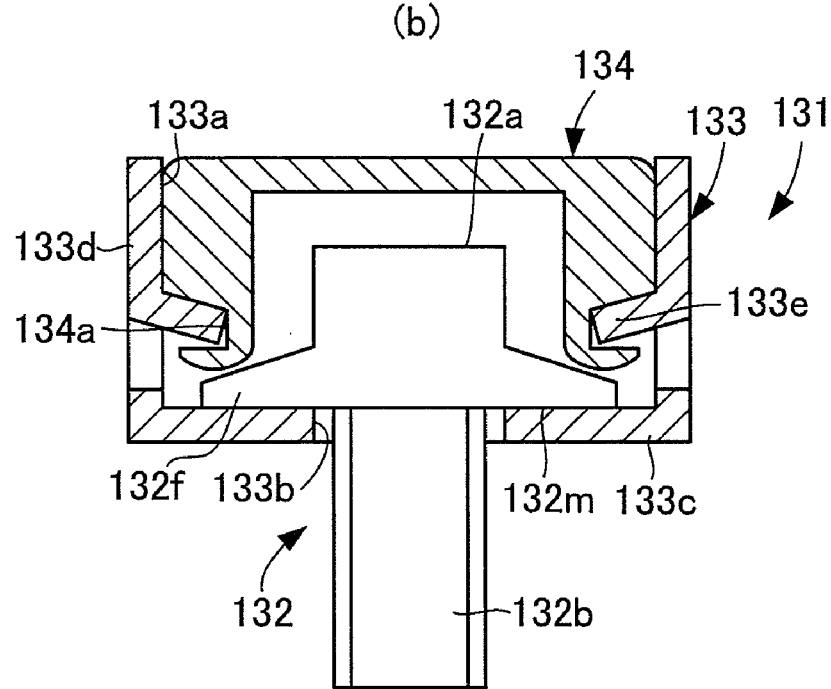

FIG.14
(a)
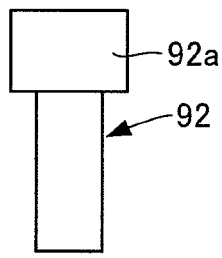
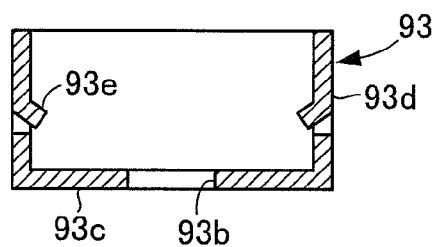
(b)
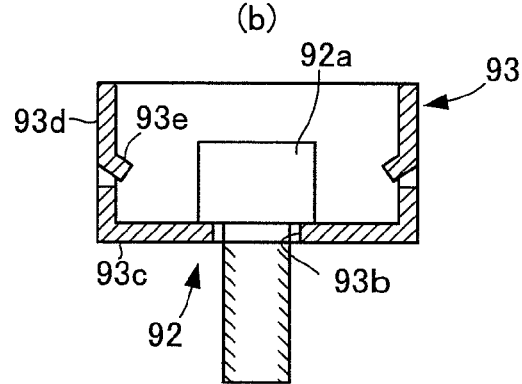
(c)
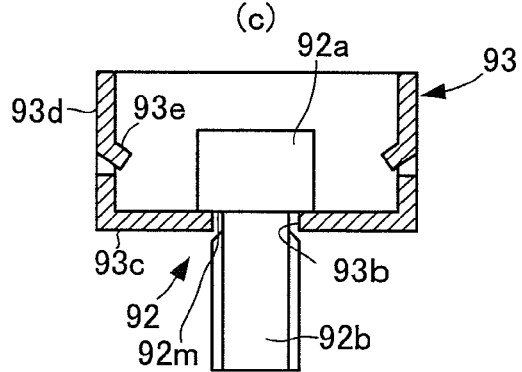

FIG.16
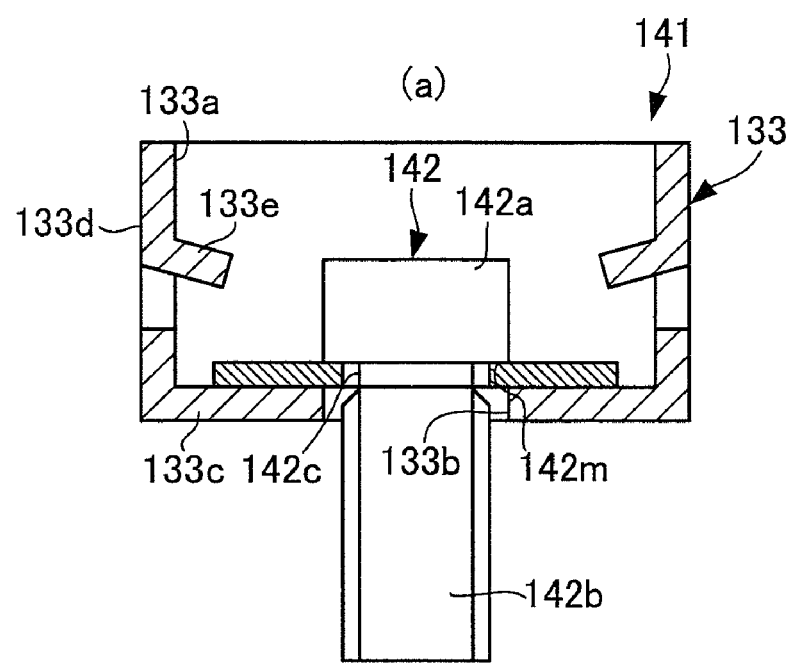
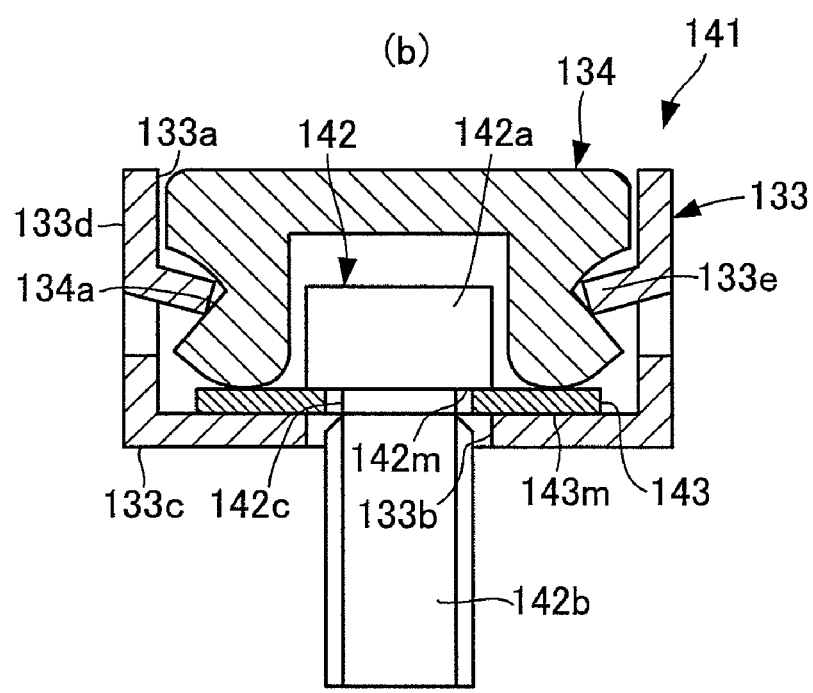

FIG. 18
(a)
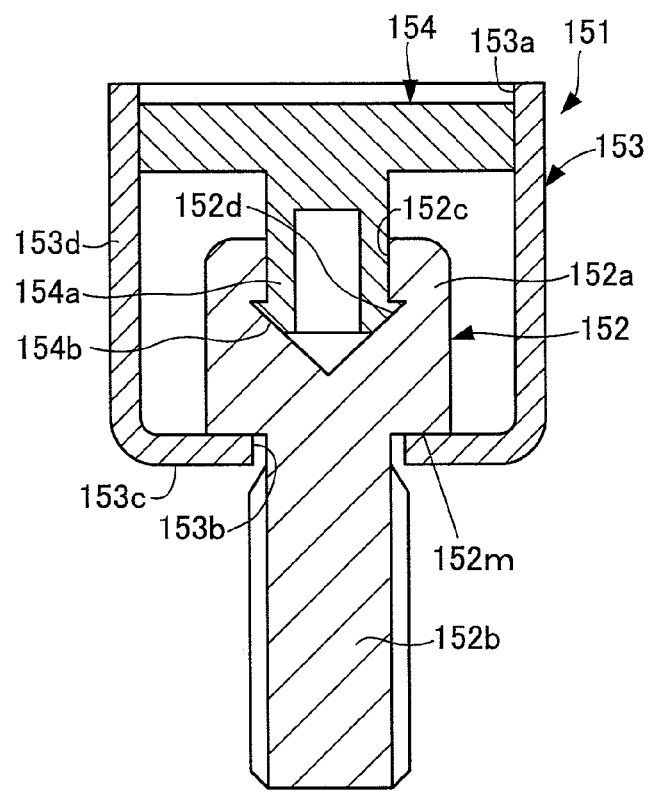
(b)
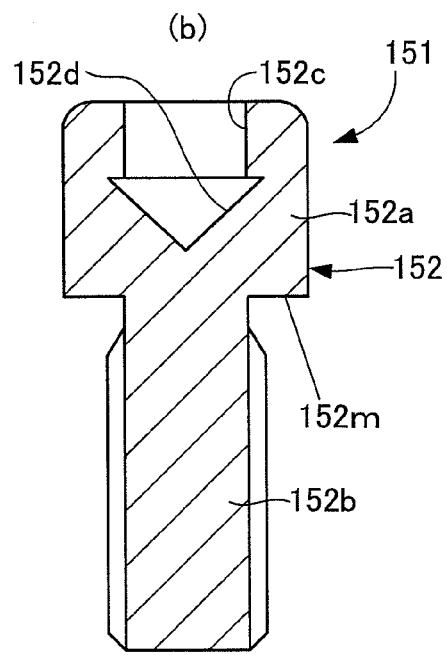

FIG.19
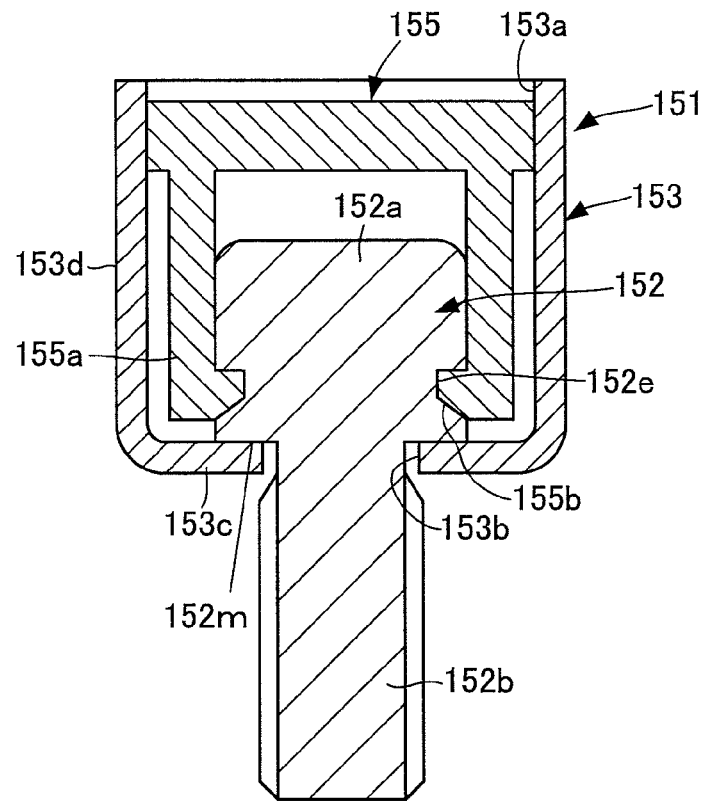
(a)
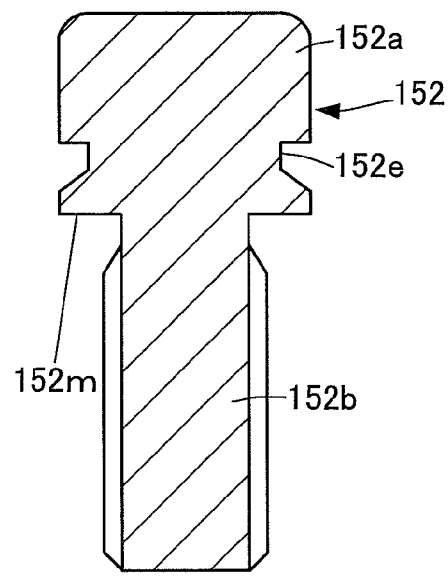
(b)

FASTENING STRUCTURE

This application is a Continuation of International Application No. PCT/JP2008/002870 filed Oct. 10, 2008, claiming priority based on Japanese Patent Application No. 2007-266937 filed Oct. 12, 2007 and Japanese Patent Application No. 2008-108103 filed Apr. 17, 2008, the contents of all of which are incorporated herein by reference in their entirety.

BACKGROUND

1. Field of Invention

The present invention relates to a fastening structure and, in particular, to a fastening structure for the purpose of fastening an attaching member to an attached member with a fastening device used for this purpose.

2. Background Art

The fastening device of this kind such as for example a bolt and the like has so far been known to be used for fastening the attaching member to the attached member. The fastening device is generally designed to be firmly coupled with the attaching and attached members and by no means intended to be removed from the attaching and attached members to ensure that the fastening device functions to be an anti-theft device for protecting the attaching and attached members from theft. Many kinds of fastening devices as such anti-theft devices for protecting the attaching and attached members from theft have so far been employed in various fields.

For example, one of the typical examples now employed is raised an automatic transmission apparatus used for an automotive vehicle or a power transmission apparatus used for a hybrid automotive vehicle which is operated with an electric motor and an internal combustion engine as a prime mover. The power transmission apparatus is designed to electrically detect the operation of a shift lever or a shift switch for controlling range shifting means with an actuator capable of being electrically controlled. The control system of the power transmission apparatus thus constructed is called a shift-by-wire (hereinafter simply referred to as a "SBW") and adapted for changing a mechanical operating linkage into an electrical operating system, thereby giving rise to enhanced freedom to the operation method for operating a shift operation section and the arrangement of parts and elements to be operated for performing the shift operation.

In the power transmission apparatus is provided a parking lock mechanism, which is designed to mechanically lock one of the rotating members arranged in a power transmission path from an engine to drive wheels when the shift lever is shifted to a parking range.

The above power transmission apparatus of this kind is known to comprise a locking pawl of a swingable type that serves to selectively engage with and disengage from one of the rotating members arranged in the power transmission path from the engine to the drive wheels and lock the rotating member when the shift lever is shifted to the parking range, a linear motion cam for swingably operating the locking pawl, an operation link for advancing and retracting the linear motion cam, and an SBW motor for rotating the operation link (see JP-3692791).

The parking lock mechanism is constructed to allow the lock pawl to be brought into engagement with the rotating member, thereby regulating the rotations of the rotating members forming the power transmission mechanism such as gears, chains, and shafts coupled to drive wheels. This results in the fact that the vehicle cannot be moved, thereby preventing the vehicle from being stolen.

However, in the case that the SBW motor, i.e., an actuator externally mounted on the case of the power transmission apparatus equipped with the parking lock mechanism is removed from the case, there is a possibility that the vehicle is stolen since the vehicle can be moved if the lock pawl of a swingable type to be brought out of engagement from the rotating member by tampering the parking lock mechanism.

In order to prevent the actuator from being removed from the case, the actuator and the case are considered to be firmly secured with each other using an anti-theft bolt described above.

As one of the anti-theft bolts is known a bolt 235 shown in FIG. 20 and comprising a threaded portion 231 screwed into a threaded groove formed in the attached member through a through bore formed in the attaching member, an umbrella-like slant portion 232 formed on the threaded portion 231, and an engagement portion 234 integrally connected to the umbrella-like slant portion 232 through a torsion portion 233 and having an outer peripheral portion to be engaged with a hexagonal wrench (for example, see JP-A-2003-90173).

In the case that the case of the power transmission apparatus is attached with the actuator with the bolt 235, the engagement portion 234 is engaged with a tool to have the threaded portion 231 screwed into the threaded groove, and then the torsion portion 233 is twisted and forcibly cut off to make the engagement portion 234 be separated from the umbrella-like slant portion 232, thereby making it possible to expose to the outside the umbrella-like slant portion 232 which cannot be engaged with the tool.

The bolt thus constructed is utilized to firmly engage the actuator with the case of the power transmission apparatus to make it possible for the bolt to be prevented from being removed from the case as well as to make it possible for the vehicle to be prevented from being stolen by the parking lock mechanism being tampered from the outside.

In lieu of the previously mentioned bolt 235 having a construction thus explained, a one-way bolt having an engagement portion to be engaged with a tool in only one direction to have the bolt clamped down is considered to be utilized. In this case, the bolt cannot be removed from the case when the actuator is firmly attached to the power transmission apparatus (for example, see JP-A-2001-207705).

SUMMARY OF THE INVENTION

Problems to be Solved by the Invention

The conventional anti-theft bolt encounters such a problem in that the actuator cannot be removed for the maintenance of the actuator since the bolt cannot be removed in the state that the actuator is firmly engaged with the case of the power transmission apparatus with the bolt.

For this reason, the operation to remove the actuator from the case of the power transmission apparatus is considered to be performed by forming a hole in the bolt 235 or the one-way bolt with a drill and applying a screw extractor having reverse threads to the hole to extract the bolt, or otherwise by directly striking the bolt 235 or the one-way bolt via a punch or a screwdriver with a hammer.

Meanwhile, the removal operation cannot be realized if the drill is utilized due to the fact that an adequately wide working space cannot be secured for operating the drill around the bolt 235 or the one-way bolt.

Further, there is a possibility that the threaded groove formed in the case of the power transmission apparatus is so damaged to require the power transmission apparatus to be replaced with a new one if the bolt 235 or the one-way bolt is directly struck with a hammer. If a bolt that is easy to remove is used, however, the bolt hardly functions to prevent the vehicle from being stolen.

It is therefore an object of the present invention to provide a fastening structure which allows the bolt to be removed with a certainty and with ample time while it is difficult and time consuming to remove it in a narrow working space and provides both anti-theft function to prevent attaching and attached objects fastened from being stolen and ease of maintenance thereof.

Means for Solving the Problem

According to the first aspect of the present invention, there is provided (1) a fastening structure for fastening an attaching member to an attached member via a fastening device, in which the fastening device includes a bolt having a head portion and a threaded portion integrally formed with the head portion, and a bottomed tubular bolt cover having an opening end; the bolt cover includes a through bore configured to have the threaded portion of the bolt pass through, a bottom portion abutting on a bottom surface of the head portion of the bolt, and a grip portion projecting from an outer circumference of the bottom portion thereof and surrounding a periphery of the head portion of the bolt; the bolt is prevented from being rotated in a direction to remove the bolt and the bottom portion of the bolt cover is interposed between the bottom surface of the head portion of the bolt and the attaching member in a state that the attaching member is fastened to the attached member via the fastening device; the fastening device further includes a cap member accommodated in the bolt cover and closing the opening end of the bolt cover, the cap member has a first engagement portion formed thereon, and the bolt cover has a second engagement portion configured to engage with the first engagement portion and formed on an inner peripheral portion of the grip portion thereof; and an engagement between the first engagement portion and the second engagement portion is released when the cap member is pressed by the head portion of the bolt.

According to the second aspect of the present invention, there is provided (2) a fastening structure for fastening an attaching member to an attached member via a fastening device, in which the fastening device includes a bolt having a head portion and a threaded portion integrally formed with the head portion, a bottomed tubular bolt cover integrated with the bolt and having an opening end, and a cap member accommodated in the bolt cover, closing the opening end of the bolt cover and having a first engagement portion formed thereon; the bolt cover has a through bore configured to have the threaded portion of the bolt pass through, a bottom portion abutting on a bottom surface of the head portion of the bolt, and a grip portion projecting from an outer circumference of the bottom portion, surrounding a periphery of the head portion of the bolt and having a second engagement portion configured to engage with the first engagement portion and formed on an inner peripheral portion thereof; the second engagement portion is constituted by a protrusion inwardly projecting from the inner peripheral portion of the grip portion of the bolt cover, the head portion of the bolt is provided with a flange portion radially outwardly protruding from the head portion; the flange portion is made to catch the second engagement portion as the bolt is moved towards the opening end of the bolt cover; and the bolt is prevented from being rotated in a direction to remove the bolt and the bottom portion of the bolt cover is interposed between the bottom surface of the head portion of the bolt and the attaching member in a state that the attaching member is fastened to the attached member via the fastening device.

According to the third aspect of the present invention, there is provided (3) a fastening structure for fastening an attaching member to an attached member via a fastening device, the fastening device includes a bolt having a head portion and a threaded portion integrally formed with the head portion, a bottomed tubular bolt cover integrated with the bolt and having an opening end, and a cap member accommodated in the bolt cover, closing the opening end of the bolt cover and having a first engagement portion formed thereon; the bolt cover has a through bore configured to have the threaded portion of the bolt pass through, a bottom portion abutting on a bottom surface of the head portion of the bolt, and a grip portion projecting from an outer circumference of the bottom portion, surrounding a periphery of the head portion of the bolt and having a second engagement portion configured to engage with the first engagement portion and formed on an inner peripheral portion thereof; the second engagement portion is constituted by a protrusion inwardly projecting from the inner peripheral portion of the grip portion of the bolt cover, the bolt is constituted by a washer bolt provided with a small diameter portion formed on an upper end of the threaded portion thereof and a washer received and retained on the small diameter portion; the washer is made to catch the second engagement portion as the bolt is moved towards the opening end of the bolt cover; and the bolt is prevented from being rotated in a direction to remove the bolt and the bottom portion of the bolt cover is interposed between the bottom surface of the head portion of the bolt and the attaching member in a state that the attaching member is fastened to the attached member via the fastening device.

With the fastening structures (1) to (3), the fact that, in a state that the attaching member is fastened to the attached member via the fastening device, the bolt is prevented from being rotated in a direction to remove the bolt results in that the attaching member can be prevented from being removed.

In the case that the fastening device is removed from the attached member, the grip portion of the bolt cover is gripped with a tool such as a plier, and the bolt cover is turned while being pulled upwardly such that the head portion of the bolt is turned along with the bolt cover utilizing the friction force between the bottom portion of the bolt cover and the bottom surface of the head portion of the bolt. In this case, as slippage occurs between the surfaces of the bottom portion of the bolt cover and the bottom surface of the head portion of the bolt, the bolt is gradually rotated in a removing direction and slowly comes out from the attached member.

Accordingly, even when the working space between the opening end of the bolt cover and the peripheral member is narrow, by pulling and turning the bolt cover using a generally available tool such as a plier, the bolt can be removed with a certainty while it is difficult and time consuming to remove it.

Consequently, for the time it takes to remove the bolt, it can discourage a thief to continue the removal operation, and thus can reduce a possibility of having the attaching member and the attached member that are objects fastened stolen and allow the maintenance operation of the attaching member to be performed with a certainty.

The fact that the bolt is removed by utilizing the friction force between the bottom portion of the bolt cover and the bottom surface of the head portion of the bolt results in that it takes time to remove the bolt, even if a special tool made for the removal of the bolt is used, thereby preventing the attaching member from being stolen.

The fact that the bolt can be removed with certainty and with ample time results in that it is not necessary to remove the bolt by drilling a hole therein for a screw extractor having reverse threads to be inserted in the hole or otherwise to strike the bolt with a hammer and the like via a punch or a screwdriver to remove the bolt, thereby preventing the bolt and the attached member from being damaged.

Further, when fastening the attaching member to the attached member via the fastening device, after the bottom portion of the bolt cover is interposed between the bottom surface of the bolt and the attaching member, the cap member is secured to the bolt cover by making the first engagement portion of the cap member engage with the second engagement portion of the grip portion such that the opening end of the bolt cover is closed by the cap member.

In this case, the fact that the head portion of the bolt is covered with the cap member preventing the bolt from being tampered from the outside of the bolt cover results in that the bolt cannot be rotated in a removing direction with even a simple construction using an inexpensive bolt such as a hex head bolt and the cap member, thereby preventing the bolt from being removed from the attached member.

With the fastening structure (1), the fact that, after the fastening device is removed from the attached member, the engagement between the first engagement portion and the second engagement portion is released by pressing the cap member with the head portion of the bolt results in that, when reattaching the attaching member to the attached member after the maintenance operation of the attaching member is completed, the attaching member is fastened to the attached member again while the cap member is being removed from the bolt cover.

With the fastening structures (2) and (3), the attaching member can be attached to the attached member using the bolt and the bolt cover that are integrated with each other. In this case, as there is no need to position the bolt and the bolt cover individually with respect to the attaching member and the attached member, by screwing the bolt, i.e., in one step, the attaching member can be attached to the attached member with the bolt and the bolt cover, and thus the workability of fastening the fastening device can be improved.

In the case that the cap member is attached to the bolt cover after the attaching member is attached to the attached member with the bolt and the bolt cover, the attaching member can be attached to the attached member via the fastening device in two steps, and thus the workability of fastening the fastening device can be improved.

With the fastening structure (2), the fact that the flange portion formed on the head portion of the bolt is made to catch the second engagement portion formed on the grip portion of the bolt cover when the bolt is moved towards the opening end of the bolt cover prevents the bolt from coming off from the bolt cover, thereby integrating the bolt and the bolt cover with each other.

The fact that the bolt and the bolt cover can be integrated with each other by making the flange portion formed on the head portion of the bolt catch the second engagement portion formed on the grip portion of the bolt cover leads to the fact that, when the bolt and the bolt cover are plated individually and the protrusion is formed on the grip portion of the bolt cover after the bolt is attached to the bolt cover, the bottom surface of the flange portion of the bolt in opposing relation to the bottom portion of the bolt cover can be plated with a certainty and, when the bolt and the bolt cover are integrated with each other, the operation to confirm whether or not the bottom surface of the flange portion is plated becomes unnecessary as well.

When the bolt is screwed into the attached member via the attaching member, the entire bottom surface of the flange portion of the bolt abuts on the bottom portion of the bolt cover making it possible for the area of contact between the flange portion and the bottom portion of the bolt cover to be large, thereby increasing the tightening force of the bolt.

Consequently, the fact that the attaching member is firmly secured to the attached member via the bolt results in that it takes a longer time in the removal operation of the bolt, thereby further reducing a possibility of the attaching member and the attached member that are the objects fastened being stolen.

With the fastening structure (3), the fact that the washer received and retained on the small diameter portion formed on the upper end of the threaded portion is made to catch the second engagement portion formed on the grip portion of the bolt cover when the bolt is moved towards the opening end of the bolt cover prevents the bolt from coming off from the bolt cover, thereby integrating the bolt and the bolt cover with each other.

When the bolt and the bolt cover are plated individually and the protrusion is formed on the grip portion of the bolt cover after the bolt is attached to the bolt cover, the bottom surface of the head portion of the bolt in opposing relation to the bottom portion of the bolt cover via the washer can be plated with a certainty and, when the bolt and the bolt cover are integrated, the operation to confirm whether or not the bottom surface of the head portion is plated becomes unnecessary as well.

Effects Of The Invention

According to the present invention, a fastening structure can be provided that allow the bolt to be removed with a certainty while being difficult and time consuming to remove it in a narrow working space, and provide both the anti-theft function to prevent the attaching and attached objects fastened from being stolen and the ease of maintenance thereof.

BRIEF DESCRIPTION OF THE DRAWINGS

FIGS. 6(a) to 6(c) illustrate the fastening structure according to the first embodiment, FIG. 6(a) being a cross-sectional view of the fastening device, FIG. 6(b) being a plan view of a cap member, and FIG. 6(c) being a bottom view of the cap member;

FIGS. 7(a) to 7(c) illustrate the fastening structure according to the first embodiment, FIG. 7(a) being a plan view of a bolt cover, FIG. 7(b) being a top view of the bolt cover, and FIG. 7(c) being a cross-sectional view of the bolt cover;

FIGS. 8(a) to 8(c) illustrate the fastening structure according to the first embodiment and are cross-sectional views of a fastening device and fastened objects showing procedure for removal of a bolt;

FIGS. 9(a) and 9(b) illustrate a fastening structure of a first reference example, FIG. 9(a) being a cross-sectional view of a fastening device, and FIG. 9(b) being a top view of a bolt;

FIGS. 10(a) to 10(c) illustrate the fastening structure of the first reference example and are cross-sectional views of the fastening device and fastened objects showing procedure for removal of the bolt;

FIGS. 11(a) and 11(b) illustrate a fastening structure of a second reference example, FIG. 11(a) being a cross-sectional view of a fastening device, and FIG. 11(b) being a top view of a bolt;

FIGS. 13(a) and 13(b) illustrate a fastening structure according to a second embodiment of the present invention, FIG. 13(a) being a cross-sectional view of a fastening device without a cap member being fitted, and FIG. 13(b) being a cross-sectional view of the fastening device with the cap member being fitted;

FIGS. 14(a) to 14(c) are cross-sectional views of a fastening device illustrating procedure for assembling the fastening device to integrate a bolt cover with a bolt that is different from the second embodiment;

FIGS. 16(a) and 16(b) illustrate a fastening structure according to a third embodiment of the present invention, FIG. 16(a) being a cross-sectional view of the fastening device without a cap member being fitted, and FIG. 16(b) being a cross-sectional view of the fastening device with the cap member being fitted;

FIGS. 18(a) and 18(b) illustrate a fastening structure of a third reference example, FIG. 18(a) being a cross-sectional view of a fastening device, and FIG. 18(b) being a cross-sectional view of a bolt;

FIGS. 19(a) and 19(b) illustrate the fastening structure of the third reference example, FIG. 19(a) being a cross-sectional view of a fastening device of another construction, and FIG. 19(b) being a cross-sectional view of a bolt of another construction.

DESCRIPTION OF REFERENCE NUMERALS

1: Engine (Prime Mover)
10: Power Transmission Apparatus (Attached Member)
11: Transmission Case (Case)
17, 18: Rotating Member
20: Parking Lock Mechanism
21: SBW Motor (Attaching Member, Actuator)
31: Stator (Conversion Mechanism)
32: Rotor (Conversion Mechanism)
91, 101, 111: Fastening Device
92, 102: Bolt
92a, 102a: Head Portion
92b, 102b: Threaded Portion
92m, 102m: Bottom Surface
93, 103: Bolt Cover
93a, 103a: Opening End
93b, 103b: Through Bore
93c, 103c: Bottom Portion
93d, 103d: Grip Portion
93e: Convex Engagement Portion (Second Engagement Portion)
94: Cap Member
94c: Concave Engagement Portion (First Engagement Portion)
102c: Cross-shaped Groove (Engagement Portion)
112: Vehicle Body (Peripheral Member)
131, 141, 151: Fastening Device
132, 142, 152: Bolt
132a, 142a, 152a: Head Portion
132b, 142b, 152b: Threaded Portion
132f: Flange Portion
132m, 142m, 152m: Bottom Surface
133, 153: Bolt Cover
133a, 153a: Opening End
133b, 153b: Through Bore
133c, 153c: Bottom Portion
133d, 153d: Grip Portion
133e: Convex Engagement Portion (Second Engagement Portion, Protrusion)
134, 154: Cap Member
134a: Concave Engagement Portion
142c: Small Diameter Portion
143: Washer
152d, 152e: Annular Groove (First Retaining Engagement Portion)
154b: Annular Protrusion (Second Retaining Engagement Portion)

DETAILED DESCRIPTION OF THE PREFERRED EMBODIMENTS

Fastening structures according to preferred embodiments of the present invention will be described hereinafter with reference to accompanying drawings.

First Embodiment

FIGS. 1 to 8 show a fastening structure according to a first embodiment of the present invention. The construction thereof will firstly be explained hereinafter.

Figure 1:
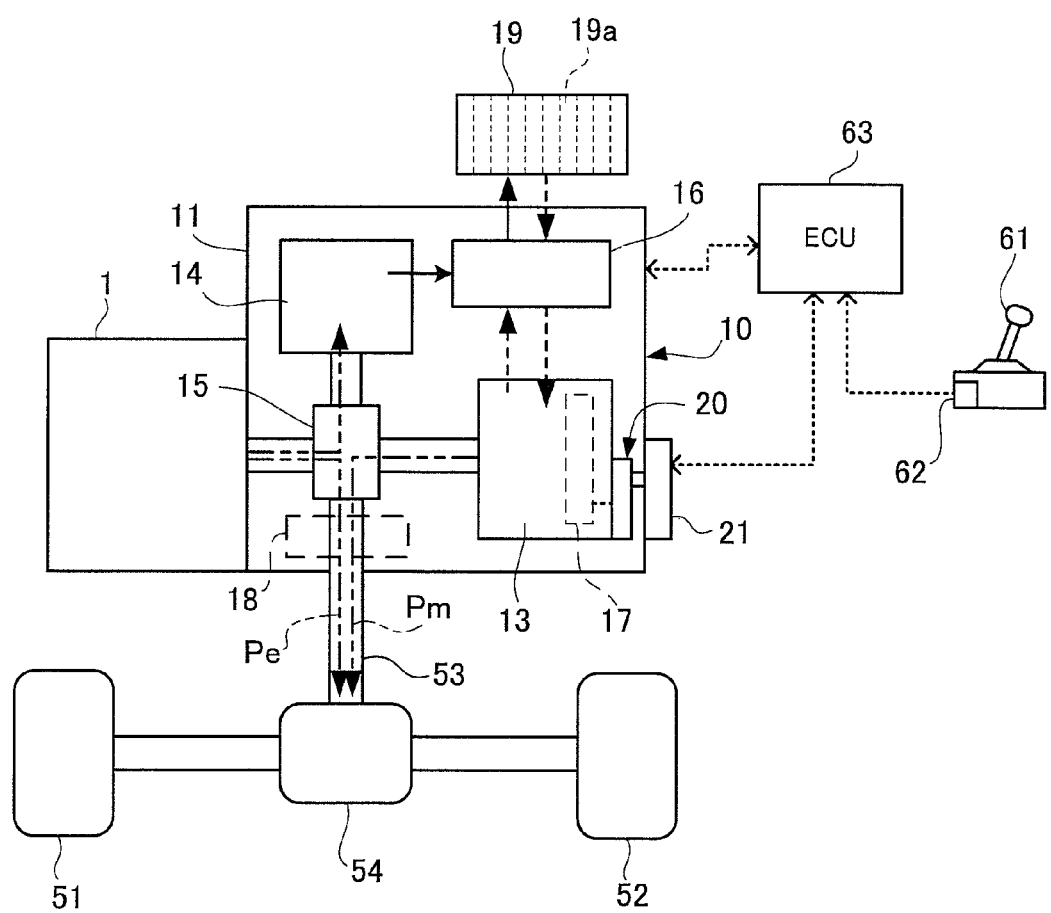
FIG. 1 illustrates a fastening structure according to a first embodiment of the present invention and is a schematic diagram of a hybrid power unit and an SBW system of a vehicle provided with a power transmission apparatus.

In FIG. 1, a power transmission apparatus 10 constituting an attached member is a hybrid transmission having a transmission case 11 constituting a case and connected to an engine 1 constituting a prime mover of an automotive vehicle. In the transmission case 11 is accommodated an electric motor 13 of an AC synchronous type, a generator 14, a power splitting mechanism 15, and an inverter 16.

The electric motor 13 is constituted by a generator-motor which can be driven by a battery pack 19 mounted on the vehicle and can charge the battery pack 19 when regeneration brake is operated. The generator 14 is adapted to generate power when driven by the engine 1, while the power thus generated is stored in the battery pack 19.

The battery pack 19 is for example constituted by a plurality of battery modules 19a connected in series, each of which integrally houses a plurality of battery cells.

The power splitting mechanism 15 is constituted by a known gear mechanism functioning to distribute and split the power from the engine 1 to the drive wheels 51 and 52 through a power transmitting shaft 53 and a differential mechanism 54, and to the generator 14.

Although the construction of the power transmission apparatus 10 according to the present embodiment will not be described in detail hereinafter, the power splitting mechanism 15 to distribute and split the power from the engine 1 is constituted by a planetary gear mechanism which comprises a sun gear, a plurality of pinions arranged around the sun gear, a carrier supporting the pinions to enable the pinions to rotate around their respective own axes and around the sun gear, and a ring gear having inner teeth held in mesh with the pinions. The planetary gear mechanism is operated when the carrier supporting the pinions is inputted with the power from the engine 1 and when one of the ring gear and sun gear, for example, the ring gear is inputted with the power from the electric motor 13, to ensure that the rotation of the sun gear is outputted to the input shaft of the generator 14. The ring gear is provided with a rotation output element for transmitting the power to the drive wheels 51 and 52.

The inverter 16 is known in the art and adapted to optimally control DC current to and from the battery pack 19, and to control AC current for driving the electric motor 13 or AC current generated by the generator 14.

The power transmission apparatus 10 is equipped with a known power transmission mechanism to form power transmission paths (shown by arrows Pe and Pm in FIG. 1) for transmitting the power from engine 1 and the electric motor 13 to the drive wheels 51 and 52. In the power transmission path is arranged a plurality of rotating members 17 and 18 such as for example gears which are not shown in the drawings.

The rotating member 17 selected from the rotating members 17 and 18 is for example integrally connected with the rotation output element of the electric motor 13. The rotating member 18 is for example adapted to constitute a transmission element forming any one of transmission gears and reduction gears arranged between the rotation output element in the power splitting mechanism 15 and the differential mechanism 54 that is capable of outputting differential output to the drive wheels 51 and 52.

On the other hand, the automotive vehicle is shown in FIG. 1 to comprise a shift lever 61 to be operated to shift driving ranges by a driver, a range detection sensor 62 for detecting a selected range, i.e., an operation position occupied by the shift lever 61, and an electronic control unit (hereinafter simply referred to as "ECU") for electronically controlling the operation of the power transmission apparatus 10 on the basis of the information detected by the range detection sensor 62. The shift lever 61 is operative to arbitrarily select one range from among a plurality of driving ranges (forward ranges (for example, "D", "L", "2"), a reverse range (for example "R"), a neutral range (for example, "N"), and a parking range (for example, "P")).

The ECU 63 has a hardware construction such as a central processing unit (CPU), a read only memory (ROM), a random access memory (RAM), and a backup memory, which are not shown in detail in the drawings. The ECU 63 further includes an input interface circuit having an A/D converter, an output interface circuit having a relay circuit, and a communication interface circuit for communicating with other ECUs.

The power transmission apparatus 10 comprises a parking lock mechanism 20 of a shift-by-wire type controlled by the ECU 63 in response to the range position selected by the shift lever 61. The parking lock mechanism 20 is provided inside the transmission case 11.

The parking lock mechanism 20 is constructed to mechanically lock one of the rotating members 17 and 18, for example, the rotating member 17 in the power transmission path when the shift lever 61 is operated to select the parking range (P), while to release the locked state of the rotating member 17 when the shift lever 61 is operated to select one of a non-parking ranges including the forward ranges (D, L, 2), the reverse range (R), and the neutral range (N).

Figure 2:
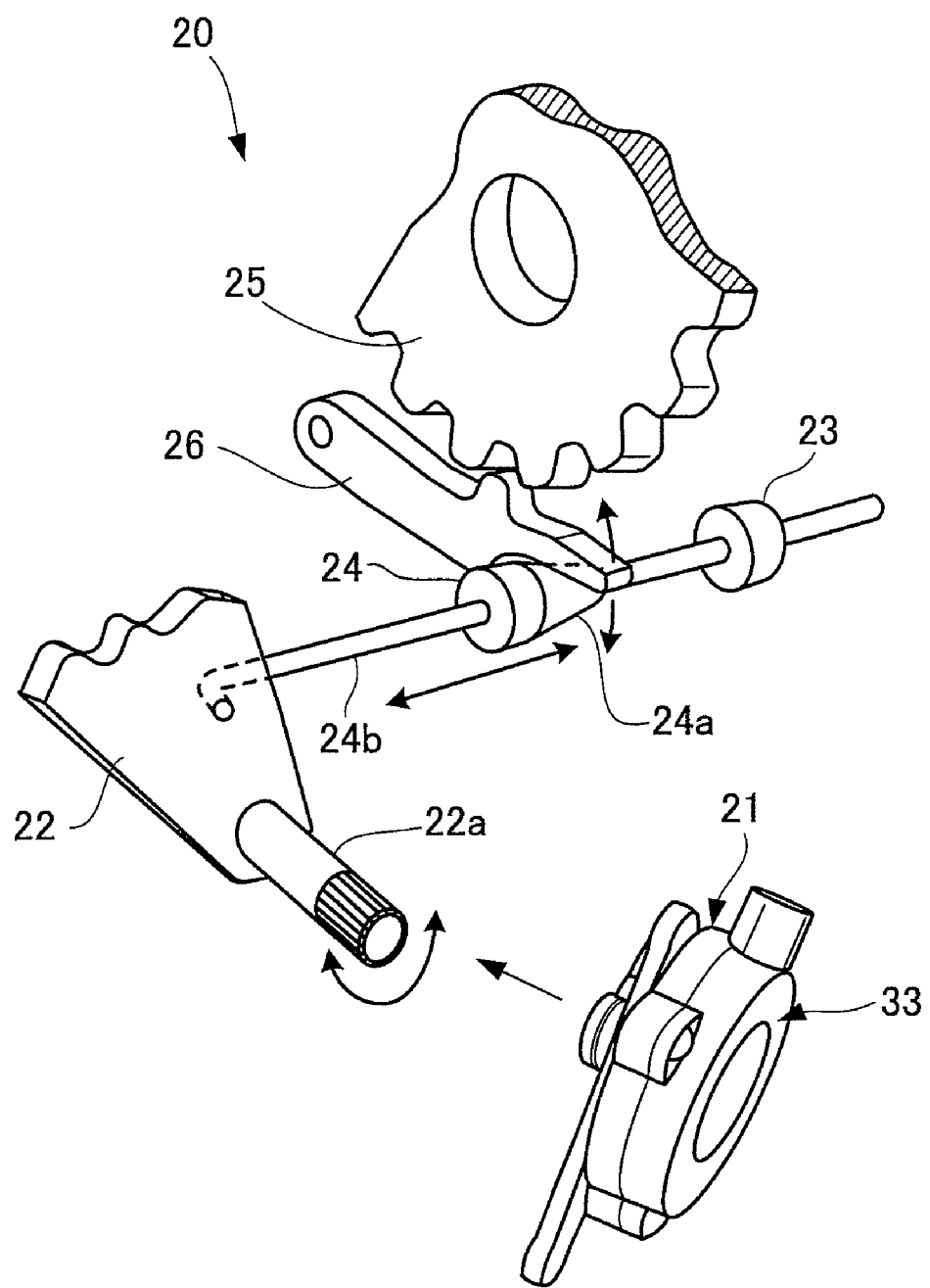
FIG. 2 illustrates the fastening structure according to the first embodiment and is a perspective view schematically showing primary components of a parking lock mechanism.

More specifically, the parking lock mechanism 20 is shown in FIG. 2 to comprise an SBW motor 21 as an actuator and an attaching member externally mounted on the transmission case 11. The parking lock mechanism 20 further comprises an operation link 22 rotationally operated by the SBW motor 21 through a shaft 22a splined to the SBW motor 21, a linear motion cam 24 connected with the operation link 22 through a shaft member 24b and axially movably supported on a guide portion 23 in the transmission case 11, and a lock pawl member 26 engageable with and disengageable from any one of the rotating members 17 and 18 or a lock gear 25 in response to the axial movement of the linear motion cam 24. The lock gear 25 is engaged with a cam portion 24a formed in a truncated cone shape and forming part of the linear motion cam 24, and is integrally connected with one of the rotating members 17 and 18.

When the shift lever 61 is operated to select the parking range (P), the operation link 22 is operated by the SBW motor 21 to be rotated in a clockwise direction and to move the linear motion cam 24 in a right direction in FIG. 2 so that the lock pawl member 26 engaged with the cam portion 24a formed in a truncated cone shape and forming part of the linear motion cam 24 engages with the lock gear 25 to establish a locked state of the lock gear 25.

When the shift lever 61 is operated to select the range other than the parking range (P), the operation link 22 is operated by the SBW motor 21 to be rotated in a counter-clockwise direction thereby moving the linear motion cam 24 in a left direction in FIG. 2 so that the lock pawl member 26 is disengaged from the lock gear 25 to enable the lock gear 25 to be rotatable.

The parking lock mechanism 20 itself is the same as a parking lock mechanism known in the art. The power transmission apparatus 10 may be a known multi-stage automatic transmission in which the operation link 22 also operates a manual valve in the shift-by-wire system and thus is formed on the top end with indentations as shown in FIG. 2 to operate an operation rod for the manual valve.

Figure 3:
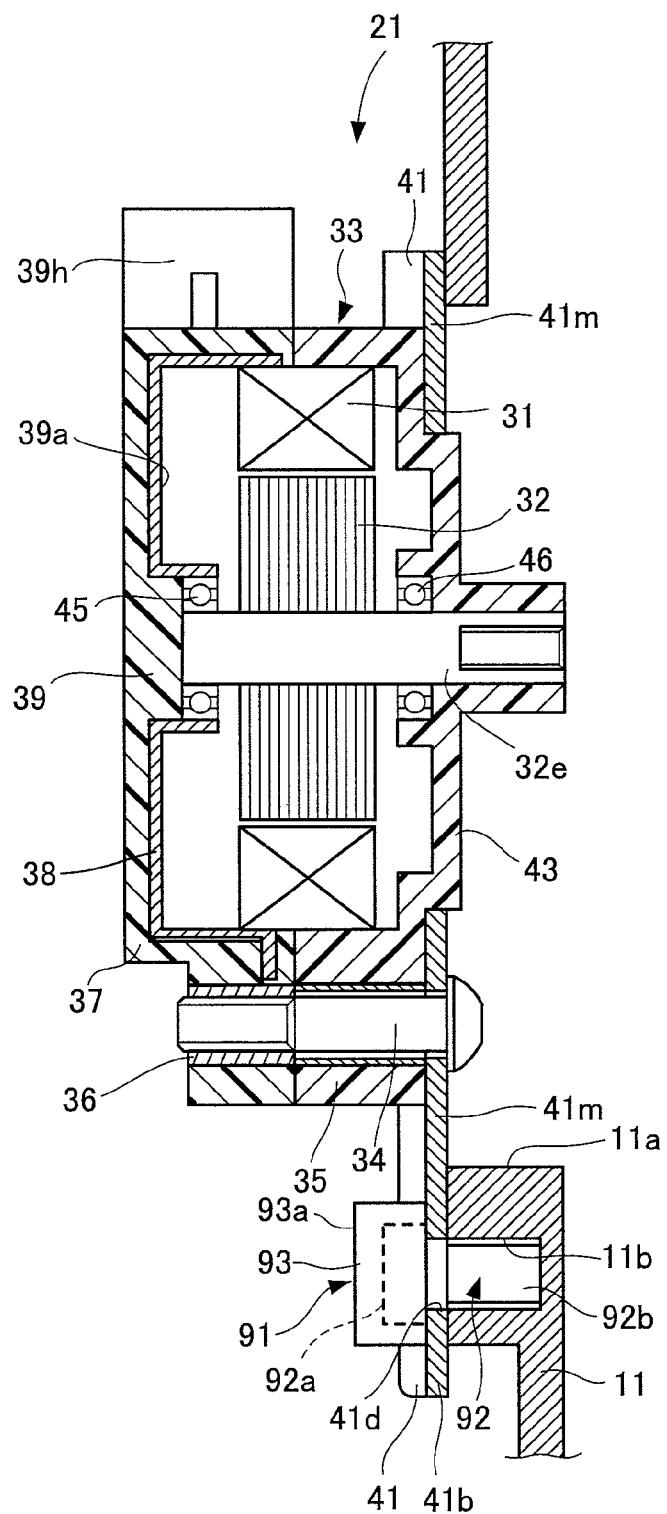
FIG. 3 illustrates the fastening structure according to the first embodiment and is a vertical cross-sectional view of an actuator.
Figure 4:
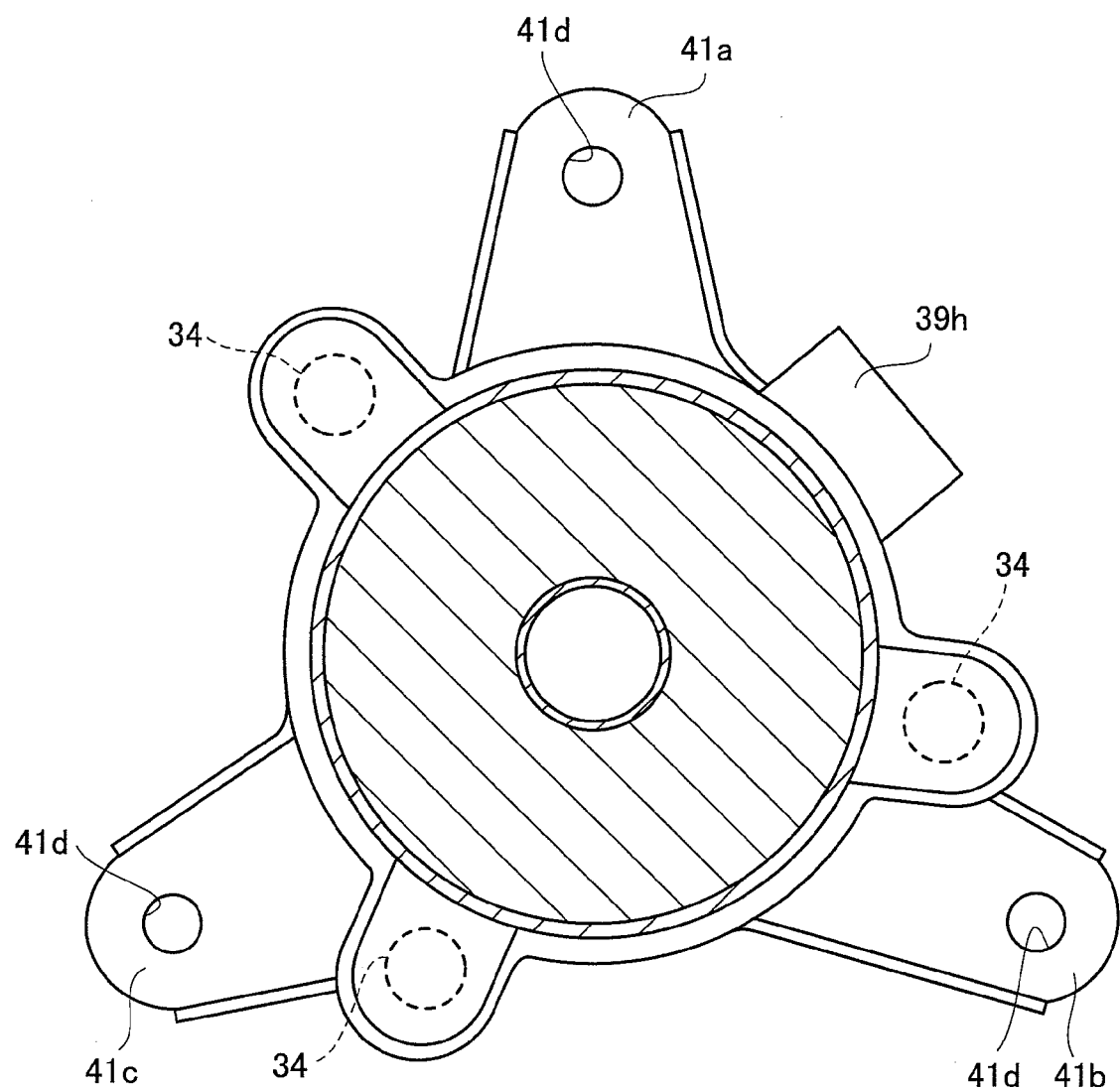
FIG. 4 illustrates the fastening structure according to the first embodiment and is a cross-sectional view of the dorsal side of a case body of the actuator overlapped only with a metal cover portion of a cover member.

The shift-by-wire control is performed by an actuator which serves as the attaching member and is constituted by the SBW motor 21. The SBW motor 21 is shown in FIGS. 3 and 4 to comprise a stator 31, a rotor 32, and a motor case 33 encasing the stator 31 and the rotor 32. The stator 31 and the rotor 32 constitute in combination a converter mechanism for converting electric energy, i.e., inputted energy into rotational motion, i.e., mechanical motion. The SBW motor 21 is constituted by a switched reluctance motor.

The motor case 33 includes a bottomed tubular case body 35, and a cover member 37. The case body 35 has a cover connection member 34 constituted by a metal bolt supported thereon, while the cover member 37 has a metal connection member 36 constituted by a metal insert nut supported thereon. The stator 31 is accommodated in and supported by the case body 35 and the cover member 37.

The cover member 37 is constituted by a metal cover portion 38 and a resin cover portion 39 which are integrally formed with each other. The metal cover portion 38 is best shown in FIG. 3 to partly cover the stator 31 and the rotor 32.

The resin cover portion 39 of the cover member 37 is made of resin excellent in molding and high in hardness, and covers the outer peripheral surface of the metal cover portion 38 to form an outer surface of the cover member 37.

More specifically, the metal cover portion 38 preliminarily pressed to form in a shape shown in FIG. 3 is embedded in the resin to be produced into the resin cover portion 39 through insert molding and retained by the resin cover portion 39 in a unified manner.

The resin cover portion 39 is shown in FIG. 4 to be integrally formed with a connector case 39h accommodating therein contact members and electric wires which are in turn electrically connected with a control board.

The metal connection member 36 constituted by a metal insert nut constitutes one of the threaded members embedded in the resin cover portion 39 of the cover member 37, while the metal cover connection member 34 constituted by a bolt provided in the motor case 33 constitutes the other of the threaded members inserted from a mounting surface 41m (see FIG. 3) of the SBW motor 21 and held in threaded engagement with the metal connection member 36.

The case body 35 has a metal bracket portion 41 having the mounting surface 41m, a metal case portion partly covering the output side of the SBW motor 21, i.e., one ends of the stator 31 and the rotor 32 but not shown in the drawings, and a resin case portion 43 positioned between the metal bracket portion 41 and the metal case portion to cover the metal case portion.

Figure 5:
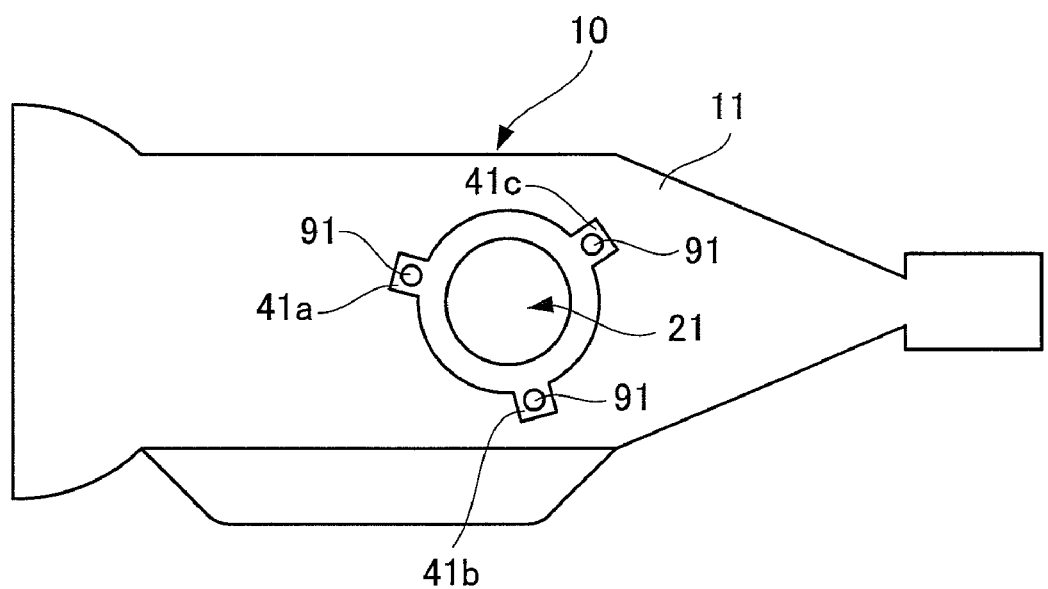
FIG. 5 illustrates the fastening structure according to the first embodiment and is an outline view of the power transmission apparatus with the actuator being fastened.

The metal bracket portion 41 is shown in FIG. 5 to have a plurality of fastening portions 41a, 41b and 41c fastened to the transmission case 11 with an anti-theft fastening device 91. The fastening portions 41a, 41b and 41c are formed with respective through bores 41d.

The rotor 32 of the SBW motor 21 is directly connected to the shaft 22a supporting the operation link 22 of the parking lock mechanism 20, or indirectly connected to the shaft 22a through a reduction mechanism not shown. The rotor 32 is rotatably supported by a bearing 45 positioned close to the cover member 37 fitted into the central portion of the metal cover portion 38 and by a bearing 46 fitted into the case body 35 (metal case portion).

The fastening device 91 is shown in FIG. 6 to comprise a bolt 92 having a head portion 92a and a threaded portion 92b integrally formed with the head portion 92a, a bottomed tubular bolt cover 93 having an opening end 93a, and a cap member 94 closing the opening end 93a of the bolt cover 93.

The head portion 92a of the bolt 92 has a fitting groove formed in a polygonal shape (female head) to be fitted with a wrench such as a hexagonal wrench so that the head portion 92a of the bolt 92 can be rotated in clamping-down and removing directions with the wrench to be screwed in threaded engagement with a threaded groove 11b formed in the transmission case 11. According to the present invention, the head portion 92a of the bolt 92 may have a peripheral surface formed in a polygonal shape (male head), such as a hexagonal shape to be engaged with a wrench (socket wrench) having the same shape so that the head portion 92a of the bolt 92 can be rotated selectively in clamping-down and removing directions with the wrench.

The bolt cover 93 is shown in FIGS. 6 and 7 to be formed with a through bore 93b configured to have the threaded portion 92b of the bolt 92 pass through. The bolt cover 93 includes a bottom portion 93c held in contact with a bottom surface 92m of the head portion 92a of the bolt 92, and a grip portion 93d projecting from the outer peripheral portion of the bottom portion 93c to surround the head portion 92a of the bolt 92. On the inner peripheral portion of the grip portion 93d are formed a plurality of convex engagement portions 93e circumferentially spaced apart from one another at a predetermined interval and each constituting a second engagement portion.

The lower portion of the cap member 94 is formed with a plurality of tongue portions 94b circumferentially arranged to intervene between slits 94a and the respective tongue portions 94b are formed with concave engagement portions 94c to be engageable with and disengageable from the convex engagement portions 93e of the grip portion 93d and each constituting a first engagement portion.

In the present embodiment, the cap member 94 is accommodated in the bolt cover 93 to have the concave engagement portions 94c engage with the convex engagement portions 93e of the grip portion 93d, so that the cap member 94 is engaged with the bolt cover 93, thereby preventing the cap member 94 from being removed from the bolt cover 93. This means that the head portion 92a of the bolt 92 can be prevented from being rotated with a tool in a removing direction.

The concave engagement portions 94c and the convex engagement portions 93e are constructed to be disengaged from each other, thereby making it possible to remove the cap member 94 from the bolt cover 93 when the inner surface of the cap member 94 is pushed up by the head portion 92a of the bolt 92.

The operation will be described hereinafter.

In the case that the SBW motor 21 is mounted to the transmission case 11 after the completion of the maintenance operation or the like of the SBW motor 21, the threaded portion 92b of the bolt 92 is passed through the through bore 41d of the bracket 41 of the SBW motor 21 in the state that the threaded portion 92b of the bolt 92 is passed through the through bore 93b of the bolt cover 93. Under this condition, the threaded portion 92b of the bolt 92 is screwed into the threaded groove 11b of the transmission case 11 with a wrench.

At this time, the bottom portion 93c of the bolt cover 93 is positioned between the bottom surface 92m of the head portion 92a of the bolt 92 and each of the fastening portions 41a, 41b and 41c of the bracket portion 41.

The cap member 94 is then accommodated in the bolt cover 93 to have the concave engagement portions 94c engaged with the convex engagement portions 93e of the grip portion 93d, so that the cap member 94 is engaged with the bolt cover 93, thereby preventing the cap member 94 from being removed from the bolt cover 93 and preventing the head portion 92a of the bolt 92 from being rotated with a tool in a removing direction.

On the other hand, in the power transmission apparatus 10 according to the present embodiment, the transmission paths Pe and Pm are formed to transmit the power to the drive wheels 51 and 52 from the engine 1 or the electric motor 13. When the shift lever 61 is operated to select the parking range (P) under this condition, the parking lock mechanism 20 is operated to mechanically lock one of the rotating members 17 and 18 in the power transmission paths Pe and Pm, for example, the rotating member 17 integrated with the lock gear 25 constituting the rotation output element of the electric motor 13.

Under this condition, the rotation elements of the power transmission mechanism from the rotating member 17 in the power transmission path Pm to the drive wheels 51 and 52 drivably connected with the rotating member 17 through the gears, chains, shafts and the like are regulated from being rotated, thereby making it impossible for the vehicle to be moved. Therefore, the vehicle can effectively be protected from being stolen.

Meanwhile, it is assumed under this condition that someone acts with an intention of stealing to release the lock of the parking lock mechanism 20 by removing the SBW motor 21 from the transmission case 11 to rotate the shaft 22a through the through bore 11a of the transmission case 11. At this time, it is not possible to rotate the head portion 92a of the bolt 92 since the head portion 92a of the bolt 92 is covered with the cap member 94. For this reason, the SBW motor 21 cannot be removed from the transmission case 11 and the lock of the parking lock mechanism 20 cannot be released either.

On the other hand, the SBW motor 21 is required to be removed from the transmission case 11 in order to carry out the maintenance operation of the SBW motor 21. In this case, the grip portion 93d of the bolt cover 93 is gripped and turned with a tool such as a plier and the like so as to turn the bolt cover 93 as shown in FIG. 8(a). In FIG. 8, the cap member 94 is omitted to be shown.

At this time, the bolt 92 is rotated somewhat so that the bolt 92 is loosened also somewhat, but not to the degree that the bolt 92 can be removed from the transmission case 11. Under this condition, the SBW motor 21 cannot be removed from the transmission case 11.

The bolt cover 93 is then turned while being forced to move upwardly as shown in FIG. 8(b), thereby bringing the bottom portion 93c of the bolt cover 93 into a tight contact with the bottom surface 92m of the head portion 92a of the bolt 92. Under this condition, the head portion of the bolt 92 is forcibly rotated together with the bolt cover 93, utilizing a friction force between the bottom portion 93c of the bolt cover 93 and the bottom surface 92m of the head portion 92a of the bolt 92, so that the threaded portion 92b of the bolt 92 is gradually removed from the threaded groove 11b of the transmission case 11.

At this time, however, there occurs slippage between the contacting surfaces of the bottom portion 93c of the bolt cover 93 and the bottom surface 92m of the head portion 92a of the bolt 92, and thus the threaded portion 92b of the bolt 92 cannot be removed rapidly from the threaded groove 11b of the transmission case 11, while being slowly removed from the threaded groove 11b of the transmission case 11.

The bolt cover 93 may be turned in this way to remove the bolt 92 from the transmission case 11. However, a flat screwdriver 95 may be forcibly brought between the bottom portion 93c of the bolt cover 93 and each of the fastening portions 41a, 41b and 41c of the bracket portion 41 and then swung clockwise as shown by an arrow in FIG. 8(c) to forcibly move upwardly the bottom portion 93c of the bolt cover 93 when the bolt 92 is removed half way from the threaded groove 11b as shown in FIG. 8(c).

When the bolt cover 93 is further turned under this condition, the friction force between the contacting surfaces of the bottom portion 93c of the bolt cover 93 and the bottom surface 92m of the head portion 92a of the bolt 92 is increased, thereby making it difficult for the contacting surfaces of the bottom portion 93c of the bolt cover 93 and the bottom surface 92m of the head portion 92a of the bolt 92 to slip against each other. Therefore, it can facilitate the removal of the bolt 92 from the threaded groove 11b.

The power transmission apparatus 10 according to the present embodiment is provided with an anti-theft fastening device 91 for fastening the SWB motor 21 to the transmission case 11, the fastening device 91 comprising the bolt 92 having the head portion 92a and the threaded portion 92b integrally formed with the head portion 92a, the bottomed tubular bolt cover 93 having the opening end 93a, and the cap member 94 closing the opening end 93a of the bolt cover 93.

The bolt cover 93 is formed with the through bore 93b to have the threaded portion 92b of the bolt 92 pass through. The bolt cover 93 includes the bottom portion 93c held in contact with the bottom surface 92m of the head portion 92a of the bolt 92, and the grip portion 93d projecting from the outer peripheral portion of the bottom portion 93c to surround the head portion 92a of the bolt 92. The bottom portion 93c of the bolt cover 93 is positioned between the bottom surface 92m of the head portion 92a of the bolt 92 and each of the fastening portions 41a, 41b and 41c of the bracket portion 41 when the threaded portion 92b of the bolt 92 is screwed into the threaded groove 11b of the transmission case 11.

Therefore, the bolt 92 cannot be accessed with a tool from the outside of the bolt cover 93, with even a simple construction using the bolt 92 of such as an inexpensive hex head bolt and the cap member 94, so that the bolt 92 can be prevented from being rotated in a direction to remove the bolt 92.

The facts that the bolt 92 can be rotated in a direction to remove the bolt 92 utilizing the friction force between the contacting surfaces of the bottom portion 93c of the bolt cover 93 and the bottom surface 92m of the head portion 92a of the bolt 92 and that the bolt cover 93 can be turned with a tool like a plier being inserted in even a narrow working space formed by the SBW motor 21 and the peripheral members around the SBW motor 21 such as side members result in that the bolt 92 can be removed from the transmission case 11. The above operation to remove the bolt 92 from the transmission case 11 is difficult and time-consuming but can be carried out with a certainty.

It requires ample time to complete the removal operation to remove the bolt 92 from the transmission case 11, and thus it can discourage a thief to continue the removal operation. In addition to difficulties in the theft of the SBW motor 21, the power transmission apparatus 10 according to the present embodiment can reduce a possibility of having the vehicle stolen by tampering the parking lock mechanism 20 to a level as small as possible while allowing the maintenance operation of the SBW 21 to be performed with a certainty.

The fact that the bolt 92 is removed from the transmission case 11 utilizing the friction force between the contacting surfaces of the bottom portion 93c of the bolt cover 93 and the bottom surface 92m of the head portion 92a of the bolt 92 results in that the operation to remove the bolt 92 from the transmission case 11 is time-consuming, even with a special tool made for the removal of the bolt 92, thereby making it possible to prevent the vehicle from being stolen.

The fact that the bolt 92 can be removed from the transmission case 11 with a certainty and with ample time leads to the fact that there is no need to remove the bolt 92 by drilling the bolt 92 to have a hole formed therein for a screw extractor having reverse threads to be inserted in the hole or otherwise to strike the bolt 92 with a hammer and the like via a punch or a screwdriver to remove the bolt 92 from the transmission case 11. Accordingly, the bolt 92 and the threaded groove 11b of the transmission case 11 are prevented from being damaged so that the bolt 92 can be used repeatedly and there is no need to replace the power transmission apparatus 10 with a new one.

The fact that the concave engagement portions 94c and the convex engagement portions 93e can be disengaged from each other when the inner surface of the cap member 94 is pushed by the head portion 92a of the bolt 92 after removal of the fastening device 91 from the transmission case 11 leads to the fact that the SBW motor 21 can be re-mounted to the transmission case 11 in the state that the cap member 94 is being removed from the bolt cover 93 when fastening the SBW motor 21 to the transmission case 11 after the maintenance operation of the SBW motor 21 is completed.

FIGS. 9 to 10 show a fastening structure of a first reference example.

In the first reference example, the cap member is replaced with a fastening device characterized to have a one-way bolt.

The present embodiment is similar in construction to the first embodiment, and comprises the SBW motor 21 fastened to the transmission case 11. The power transmission apparatus will hereinafter be explained with reference to drawings utilized for explaining the first embodiment.

The fastening device 101 is shown in FIG. 9 to comprise a bolt 102 having a head portion 102a and a threaded portion 102b integrally formed with the head portion 102a, and a bottomed tubular bolt cover 103 having an opening end 103a.

The head portion 102a of the bolt 102 is formed with a cross-shaped groove 102c as an engagement portion fitly engageable with a Phillips head screwdriver not shown in the drawings. The bolt 102 can be rotated with the Phillips head screwdriver in one sense (clockwise direction) toward its tightened position, while cannot be rotated with the Phillips head screwdriver in the other sense (counter-clockwise direction) toward its released position due to the Phillips head screwdriver slipping with respect to the head portion 102a of the bolt 102. In other words, the head portion 102a of the bolt 102 has a construction to allow a tool like the Phillips head screwdriver to be engaged with the head portion 102a when the tool drives the bolt 102 in one sense, while not to allow the tool to be engaged with the head portion 102a when the tool drives the bolt 102 in the other sense. This means that the bolt 102 cannot be removed from the transmission case 11 once the bolt 102 is screwed into the transmission case 11.

The bolt cover 103 is formed with a through bore 103b to have the threaded portion 102b of the bolt 102 pass through. The bolt cover 103 includes a bottom portion 103c held in contact with a bottom surface 102m of the head portion 102a of the bolt 102, and a grip portion 103d projecting from the outer peripheral portion of the bottom portion 103c to surround the head portion 102a of the bolt 102. At this time when the SBW motor 21 is fastened to the transmission case 11, the bottom portion 103c of the bolt cover 103 is positioned between the bottom surface 102m of the head portion 102a of the bolt 102 and each of the fastening portions 41a, 41b and 41c of the bracket portion 41.

The operation will then be described hereinafter.

When the SBW motor 21 is mounted to the transmission case 11 after the completion of the maintenance operation or the like of the SBW motor 21, the threaded portion 102b of the bolt 102 is passed through the through bore 41d of the bracket 41 of the SBW motor 21 in the state that the threaded portion 102b of the bolt 102 is passed through the through bore 103b of the bolt cover 103.

Under this condition, the Phillips head screwdriver is fitly engaged with the cross-shaped groove 102c formed on the head portion 102a of the bolt 102 to be rotated in one sense (clockwise direction) toward its tightened position so that the threaded portion 102b of the bolt 102 can be screwed into the threaded groove 11b of the transmission case 11.

At this time, the bottom portion 103c of the bolt cover 103 is positioned between the bottom surface 102m of the head portion 102a of the bolt 102 and each of the fastening portions 41a, 41b and 41c of the bracket portion 41. When the Phillips head screwdriver is fitly engaged with the cross-shaped groove 102c in an attempt to rotate the bolt 102 in the other sense (counter-clockwise direction), the Phillips head screwdriver slips with respect to the head portion 102a of the bolt 102, and thus the bolt 102 cannot be removed from the transmission case 11.

This means that the SBW motor 21 cannot be removed from the transmission case 11, thereby making it impossible to release the lock of the parking lock mechanism 20 and preventing the vehicle from being stolen.

When the SBW motor 21 is required to be removed from the transmission case 11 to perform the maintenance operation of the SBW motor 21, the grip portion 103d of the bolt cover 103 is gripped with a tool like a plier to turn the bolt cover 103.

At this time, the bolt 102 is rotated somewhat so that the bolt 102 is also loosened somewhat, but not to the degree that the bolt 102 can be removed from the transmission case 11. Under this condition, the SBW motor 21 cannot be removed from the transmission case 11.

As shown in FIG. 10(b), the bolt cover 103 is then turned while being forced to move upwardly, thereby bringing the bottom portion 103c of the bolt cover 103 into tight contact with the bottom surface 102m of the head portion 102a of the bolt 102. Under this condition, the head portion 102a of the bolt 102 is forcibly rotated together with the bolt cover 103, utilizing a friction force between the bottom portion 103c of the bolt cover 103 and the bottom surface 102m of the head portion 102a of the bolt 102, so that the threaded portion 102b of the bolt 102 is gradually removed from the threaded groove 11b of the transmission case 11.

At this time, however, there occurs slippage between the contacting surfaces of the bottom portion 103c of the bolt cover 103 and the bottom surface 102m of the head portion 102a of the bolt 102, and thus the threaded portion 102b of the bolt 102 cannot be removed rapidly from the threaded groove 11b of the transmission case 11, while being slowly removed from the threaded groove 11b of the transmission case 11.

The bolt cover 103 may be turned in this way to have the bolt 102 removed from the transmission case 11. However, the flat screwdriver 95 may be forcibly brought between the bottom portion 103c of the bolt cover 103 and each of the fastening portions 41a, 41b and 41c of the bracket portion 41 and then swung clockwise shown by an arrow in FIG. 10(c) to forcibly move upwardly the bottom portion 103c of the bolt cover 103 when the bolt 102 is removed half way from the threaded groove 11b as shown in FIG. 10(c).

When the bolt cover 103 is further turned under this condition, the friction force between the contacting surfaces of the bottom portion 103c of the bolt cover 103 and the bottom surface 102m of the head portion 102a of the bolt 102 is increased, thereby making it difficult for the contacting surfaces of the bottom portion 103c of the bolt cover 103 and the bottom surface 102m of the head portion 102a of the bolt 102 to slip against each other. Therefore, it can facilitate the removal of the bolt 102 from the threaded groove 11b.

The power transmission apparatus 10 in the first reference example is provided with an anti-theft fastening device 101 for fastening the SWB motor 21 to the transmission case 11, the fastening device 101 comprising the bolt 102 having the head portion 102a and the threaded portion 102b integrally formed with the head portion 102a, and the bottomed tubular bolt cover 103 having the opening end 103a.

The head portion 102a of the bolt 102 is formed with the cross-shaped groove 102c fitly engageable with a Phillips head screwdriver which makes the Phillips head screwdriver slip with respect to the head portion 102a of the bolt 102 when the bolt 102 is driven in the other sense (counter-clockwise direction). The bolt cover 103 is formed with the through bore 103b for having the threaded portion 102b of the bolt 102 pass through. The bolt cover 103 includes the bottom portion 103c held in contact with the bottom surface 102m of the head portion 102a of the bolt 102, and the grip portion 103d projecting from the outer peripheral portion of the bottom portion 103c to surround the head portion 102a of the bolt 102. The bottom portion 103c of the bolt cover 103 is positioned between the bottom surface 102m of the head portion 102a of the bolt 102 and each of the fastening portions 41a, 41b and 41c of the bracket portion 41 when the threaded portion 102b of the bolt 102 is screwed into the threaded groove 11b of the transmission case 11.

Therefore, the tool can be turned in only one sense in engagement with the head portion 102a of the bolt 102 so that the bolt 102 cannot be rotated in the other sense even in engagement with the head portion 102a of the bolt 102, viz., in a direction to remove the bolt 102 from the transmission case 11. This means that the fastening device 101 cannot easily be removed from the transmission case 11.

The facts that the bolt 102 can be rotated in a direction to remove the bolt 102 utilizing the friction force between the contacting surfaces of the bottom portion 103c of the bolt cover 103 and the bottom surface 102m of the head portion 102a of the bolt 102 and that the bolt cover 103 can be turned with a tool like a plier being inserted in even a narrow working space formed by the SBW motor 21 and the peripheral members around the SBW motor 21 such as side members result in that the bolt 102 can be removed from the transmission case 11. The above operation to remove the bolt 102 from the transmission case 11 is difficult and time-consuming but can be carried out with a certainty.

It requires ample time to complete the removal operation to remove the bolt 102 from the transmission case 11, and thus it can discourage a thief to continue the removal operation. In addition to difficulties in the theft of the SBW motor 21, the power transmission apparatus 10 according to the present embodiment can reduce a possibility of having the vehicle stolen by tampering the parking lock mechanism 20 to a level as small as possible while allowing the maintenance operation of the SBW 21 to be performed with a certainty.

Figure 12:
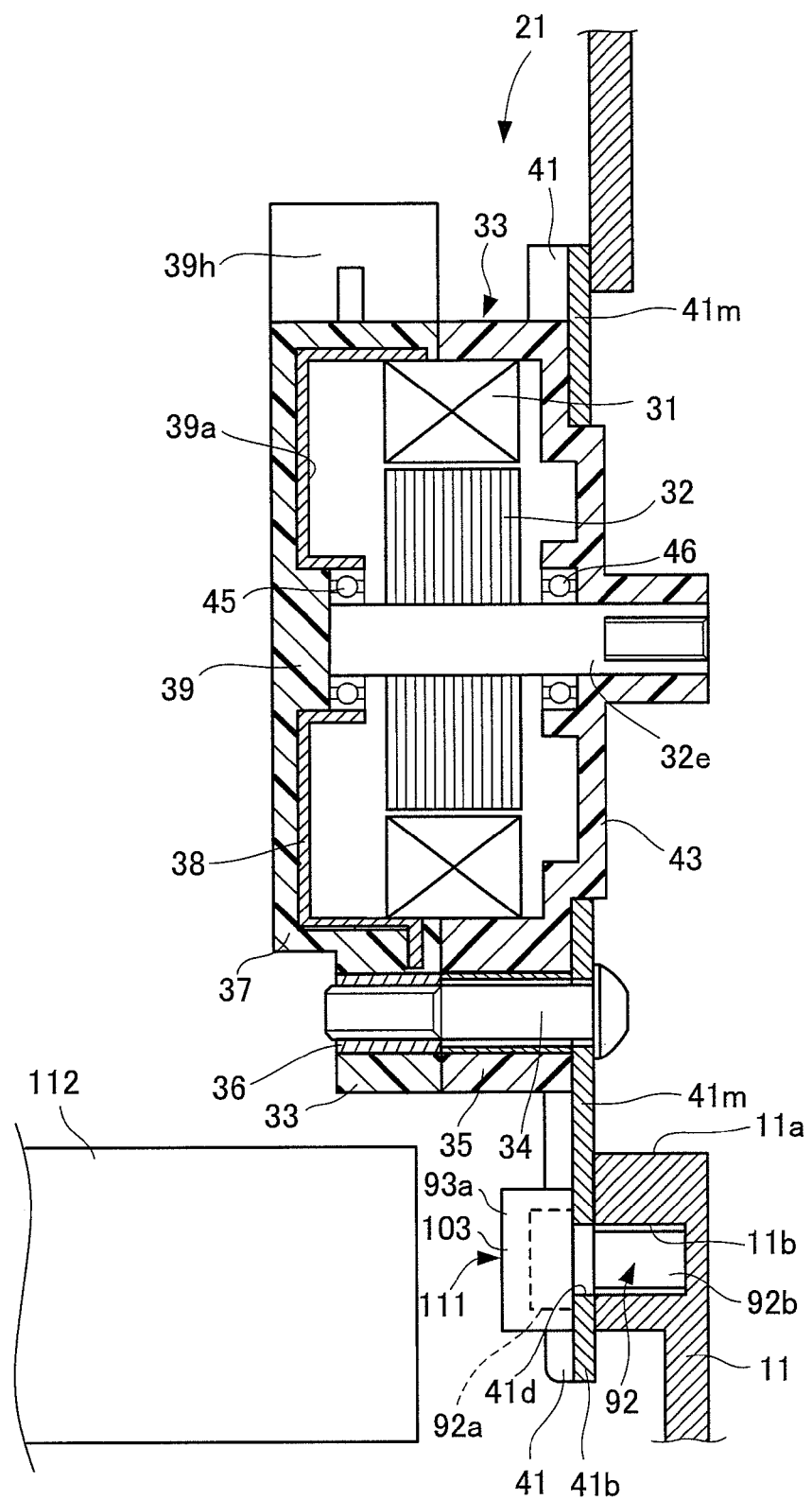
FIG. 12 illustrates the fastening structure of the second reference example and is a vertical cross-sectional view of an actuator.

FIGS. 11 to 12 show a fastening structure of a second reference example. The explanation of the second reference example will be omitted with the elements and parts same as those of the first reference example bearing the same reference numerals as those of the first reference example.

The fastening device 111 is shown in FIG. 11 to comprise the bolt 92 having the head portion 92a and the threaded portion 92b integrally formed with the head portion 92a similarly to the first embodiment, and the bottomed tubular bolt cover 103 having the opening end 103a similarly to the first reference example.

In the second reference example, the head portion 92a of the bolt 92 has a fitting groove 92d formed in a hexagonal shape (female head) to be fitted with a hexagonal wrench so that the head portion 92a of the bolt 92 can be rotated in clamping-down and removing directions with the wrench to be screwed in threaded engagement with the threaded groove 11b formed in the transmission case 11. The head portion 92a of the bolt 92 may have a fitting groove 92d formed in a polygonal shape other than the hexagonal shape according to the present invention.

The head portion 92a of the bolt 92 may have a peripheral surface in the form of a polygonal shape (male head) to be engaged with a wrench (socket wrench) of the same polygonal shape to be turned in the directions to fasten the bolt 92 to the transmission case 11 and to remove the bolt 92 from the transmission case 11 with the wrench.

As shown in FIG. 12, the opening end 103a of the bolt cover 103 is positioned in the vicinity of the peripheral members of the transmission case 11, for example, in the vicinity of the vehicle body 112 such that a working space cannot be secured to allow the tool to be inserted therein between the opening end 103a of the bolt cover 103 and the transmission case 11.

The transmission case 11 is mounted on the vehicle with the opening end 103a of the bolt cover 103 being in close proximity to the vehicle body 112. The peripheral members of the transmission case 11 are not limited to the elements and parts of the vehicle body 112, but may include front members and cross members of the vehicle body 112.

In the case that the vehicle having the vehicle body 112 and the power transmission apparatus 10 mounted thereon is constituted by the chassis, the front members and cross members form parts of the vehicle body 112, and thus constitute as the peripheral members of the transmission case 11.

In the second reference example, the fact that the opening end 103a of the bolt cover 103 is positioned in the vicinity of the vehicle body 112 leaves no working space, thereby making it impossible to remove the bolt 92 by directly turning a tool such as a wrench, but making it possible to remove the bolt 92 only by turning the bolt cover 103 while upwardly pulling it using a tool such as a plier. As a consequence, the operation to remove the bolt 92 is time-consuming and thus it can prevent the vehicle from being stolen. For this reason, even if the bolt 92 of such as an inexpensive hex head bolt is used, the bolt 92 can be prevented from being rotated in a direction to remove the bolt 92.

After the transmission case 11 is removed from the vehicle, the operation to remove the bolt 92 from the transmission case 11 can be carried out in a wide working space with ample time. This makes it possible to perform the maintenance operation of the SBW motor 21. The method of removing the bolt 92 from the transmission case 11 utilizing the bolt cover 103 is the same as that of the first embodiment of the present invention. The explanation about this method will be omitted hereinafter.

Second Embodiment

Figure 15:
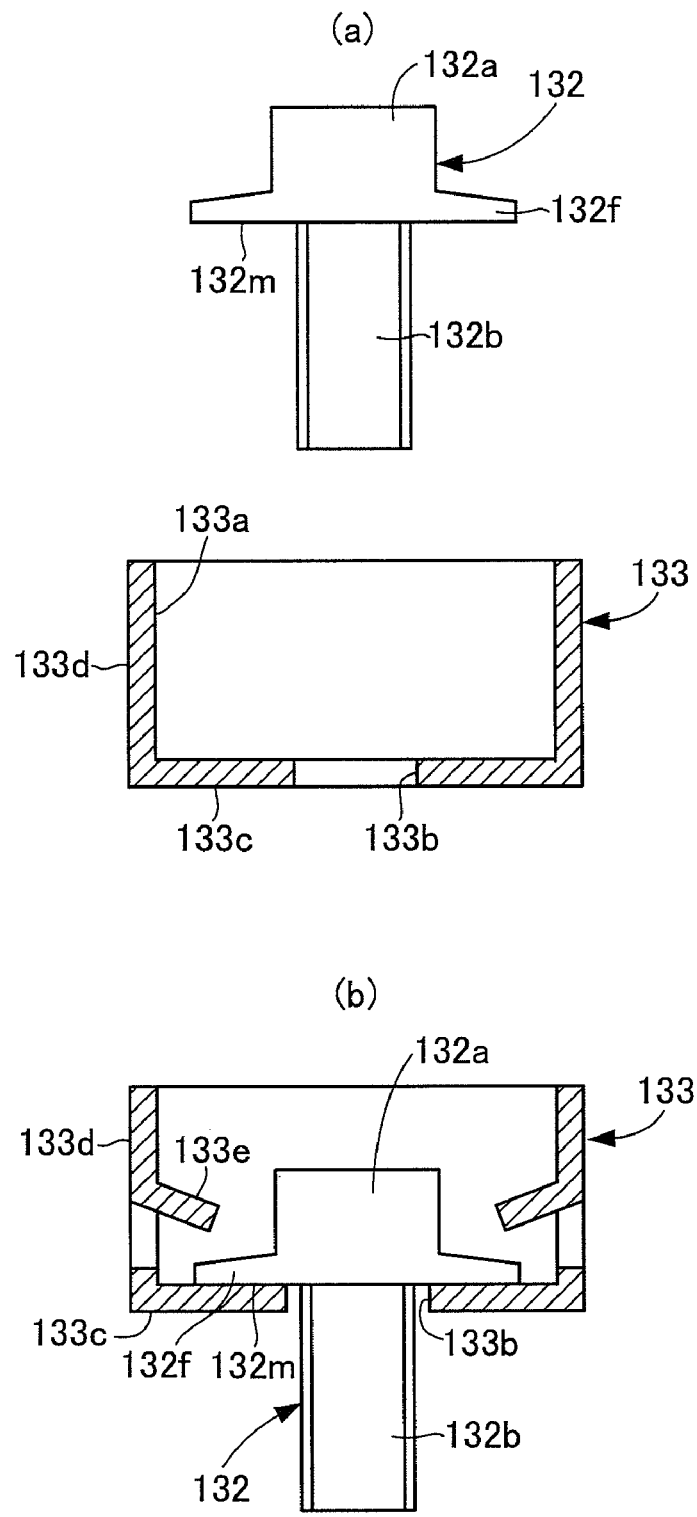
FIGS. 15(a) and 15(b) illustrate the fastening structure according to the second embodiment and are cross-sectional views of a fastening device showing procedure for assembling the fastening device to integrate a bolt cover with a bolt.

FIGS. 13 to 15 show a fastening structure according to a second embodiment of the present invention. The construction of the power transmission apparatus will be explained with reference to the drawings the same as those of the first embodiment.

The fastening device 131 is shown in FIG. 13 to comprise a bolt 132 having a head portion 132a and a threaded portion 132b integrally formed with the head portion 132a, a bottomed tubular bolt cover 133 having an opening end 133a, and a cap member 134 for closing the opening end 133a of the bolt cover 133. FIG. 13(a) shows a cross-sectional view of the fastening device 131 with the cap member 134 not being attached to the bolt cover 133, and FIG. 13(b) shows a cross-sectional view of the fastening device 131 with the cap member 134 being attached to the bolt cover 133.

The head portion 132a of the bolt 132 has a fitting groove formed in a polygonal shape (female head) to be fitted with a wrench such as a hexagonal wrench so that the head portion 132a of the bolt 132 can be rotated in clamping-down and removing directions with the wrench to be screwed in threaded engagement with a threaded groove 11b formed in the transmission case 11.

The head portion 132a of the bolt 132 may have an outer peripheral surface formed in a polygonal shape (male head) to be fitted with a wrench (socket wrench) of the same polygonal shape so that the head portion 132a of the bolt 132 is rotated in clamping-down and removing directions with the wrench.

The head portion 132a of the bolt 132 has a flange portion 132f radially outwardly projecting. The bolt cover 133 is formed with a through bore 133b to have the threaded portion 132b of the bolt 132 pass through.

The bolt cover 133 includes a bottom portion 133c held in contact with the bottom surface 132m of the flange portion 132f of the bolt 132, and a grip portion 133d projecting from the outer peripheral portion of the bottom portion 133c to surround the head portion 132a of the bolt 132. On the inner peripheral portion of the grip portion 133d are formed a plurality of convex engagement portions 133e each constituting a second engagement portion.

The parts of grip portion 133d are punched to be bent inwardly of the grip portion 133d to form the convex engagement portions 133e extending from the inner peripheral surface of the grip portion 133d toward the center of the grip portion 133d, viz., toward the axis of the bolt 132. The convex engagement portions 133e number four, for example, circumferentially spaced apart from one another at a predetermined interval.

The radially outer end of the flange portion 132f of the bolt 132 extends radially outwardly of the radially inner ends of the convex engagement portions 133e, viz., the inner diameter defined by the ends of the convex engagement portions 133e being smaller than the outer diameter of the flange portion 132f of the bolt 132. This means that the flange portion 132f of the bolt 132 is caught on the convex engagement portions 133e when the bolt 132 is moved toward the opening end 133a of the bolt cover 133.

In other words, the fastening device 131 according to the present embodiment is constructed to prevent the bolt 132 from coming off from the bolt cover 133 with the flange portion 132f of the bolt 132 being caught on the convex engagement portions 133e. This means that the bolt 132 and the bolt cover 133 are integrated with each other.

The cap member 134 has an outer peripheral portion circumferentially formed with a plurality of concave engagement portions 134a to be engageable with the respective convex engagement portions 133e. This means that the cap member 134 is securely fixed to the bolt cover 133.

In the present embodiment, the cap member 134 is accommodated in the bolt cover 133 to have the concave engagement portions 134a engage with the convex engagement portions 133e of the grip portion 133d so that the cap member 134 is engaged with the bolt cover 133, thereby preventing the cap member 134 from being removed from the bolt cover 133. This means that the head portion 132a of the bolt 132 can be prevented from being rotated with a tool in a direction to remove the bolt 132.

The cap member 134 is constructed to be removed from the bolt cover 133 with the concave engagement portions 134a being disengaged from the convex engagement portions 133e when the inner surface of the cap member 134 is pushed by the bolt 132.

The operation will then be described hereinafter.

The method of assembling fastening devices will be explained with reference to FIGS. 14 and 15. FIG. 14 are cross-sectional views showing the process of assembling a fastening device that is different from the present embodiment to integrate a bolt and a bolt cover. FIG. 15 are cross-sectional views showing the process of assembling the fastening device 131 of the present embodiment in which a bolt and a bolt cover are being integrated with each other. With reference to FIG. 14, the case in which the bolt and the bolt cover according to the first embodiment are integrated with each other will then be described hereinafter.

For carrying out the process of assembling the fastening device shown in FIG. 14, the bolt cover 93 having the engagement projection 93e produced through bending process of having a part of the bolt cover 93 punched, and a bolt 92 with the threaded portion 92b having no threads and having a diameter smaller than that of the through bore 93b are prepared (see FIG. 14(a)).

The portion of the bolt 92 to be threaded is passed through the through bore 93b of the bolt cover 93 and is then threaded as the threaded portion 92b through roll forming process (see FIG. 14(b)). The portion of the bolt 92 to be roll-threaded is shown in FIG. 14(b) with hatched lines.

The portion of the bolt 92 threaded as the threaded portion 92b through the roll forming process now has a diameter larger than the inner diameter of the through bore 93b of the bolt cover 93 so that the thread portion 92b of the bolt 92 can catch the through bore 93b, thereby preventing the bolt 92 from coming off from the bolt cover 93 (see FIG. 14(c)). Thereafter, the bolt 92 and the bolt cover 93 undergo plating process.

When the bolt 92 is assembled with the bolt cover 93 through the above assembling process, the bottom surface 92m of the head portion 92a in opposing relation to the bottom portion 93c of the bolt cover 93 cannot be viewed. It is therefore difficult to confirm whether or not the bottom surface 92m of the head portion 92a is metal plated assuredly. Moreover, there is a possibility that the bottom surface 92m of the head portion 92a is not metal plated.

In the present embodiment, the method is exemplified as shown in FIG. 15 to assemble the bolt 132 with the bolt cover 133 such that their metal plating and the confirmation of plating can be carried out with a certainty.

In FIG. 15, the bolt cover 133 and the bolt 132 having the threaded portion 132b roll-formed are metal plated individually (see FIG. 15(a)). The threaded portion 132b is then passed through the through bore 133b of the bolt cover 133, and the parts of the grip portion 133d of the bolt cover 133 are inwardly bent to form the respective convex engagement portions 133e (see FIG. 15(b)).

In the present embodiment, the bolt 132 and the bolt cover 133 are independently metal plated before being assembled with each other, and then the grip portion 133d of the bolt cover 133 is formed with the convex engagement portions 133e, so that the bottom surface 132m of the flange portion 132f in opposing relation to the bottom portion 133c of the bolt cover 1393 can be metal plated with a certainty. Moreover, this makes it unnecessary the operation of confirming whether or not the bottom surface 132m of the head portion 132a is metal plated in the state of the bolt 132 being integrated with the bolt cover 133.

Next, the method of attaching the SBW motor 21 to the transmission case 11 after completing the maintenance operation of the SBW motor 21 will be explained hereinafter.

The operator firstly picks up the bolt 132 and the bolt cover 133 integrated with each other and passes the threaded portion 132b of the bolt 132 through the through bore 41d of the bracket portion 41 of the SBW motor 21. Under this condition, the operator screws the threaded portion 132b of the bolt 132 into the threaded groove 11b of the transmission case 11 with a wrench.

Here, the bolt cover 133 and the bolt 132 are integrated with each other so that the through bore 133b of the bolt cover 133 can be positioned to the through bore 41d of the bracket portion 41 only by screwing the threaded portion 132b of the bolt 132 into the threaded groove 11b of the transmission case 11. It is therefore not required to position the through bore 133b of the bolt cover 133 with respect to the through bore 41d of the bracket portion 41.

The bottom portion 133c of the bolt cover 133 is positioned between the bottom surface 132m of the flange portion 132f of the bolt 132 and each of the fastening portions 41a, 41b and 41c of the bracket portion 41. At this time, the bottom surface 132m of the flange portion 132f of the bolt 132 is completely held in engagement with the bottom portion 133c of the bolt cover 133, thereby making it possible to increase the contact area between the flange portion 132f of the bolt 132 and the bottom portion 133c of the bolt cover 133 to ensure the increased tightening force of the bolt 132.

The cap member 134 is then accommodated in the bolt cover 133 to have the concave engagement portions 134a engaged with the convex engagement portions 133e of the grip portion 133d so that the cap member 134 is engaged with the bolt cover 133, thereby preventing the cap member 134 from being removed from the bolt cover 133. This means that the head portion 132a of the bolt 132 can be prevented from being rotated with a tool in a direction to remove the bolt 132.

On the other hand, it is assumed at the time of the parking lock mechanism 20 being locked that someone acts with an intention of stealing to release the lock of the parking lock mechanism 20 by removing the SBW motor 21 from the transmission case 11 to rotate the shaft 22a through the through bore 11a of the transmission case 11. At this time, it is impossible to rotate the head portion 132a of the bolt 132 since the head portion 132a of the bolt 132 is covered with the cap member 134. For this reason, the SBW motor 21 cannot be removed from the transmission case 11 and the lock of the parking lock mechanism 20 cannot be released either.

In the case that the SBW motor 21 is required to be removed from the transmission case 11 in order to carry out the maintenance operation of the SBW motor 21, the operation the same as that of the first embodiment is performed and thus will not be explained hereinafter.

The bolt 132 and the bolt cover 133 integrated with each other according to the present embodiment makes it possible to handle the bolt 132 and the bolt cover 133 as one piece and fasten the SBW motor 21 to the transmission case 11.

At this time, it is not required to position the bolt 132 and the bolt cover 133 separately with respect to the SBW motor 21 and the transmission case 11. Only the operation to screw the bolt 132 is performed, viz., there is no need for the steps except for only one step of having the SBW motor 21 attached to the transmission case 11 utilizing the bolt 132 and the bolt cover 133, thereby making it possible to improve workability of the fastening operation of the fastening device 131.

In the case that the cap member 134 is fitted to the bolt cover 133 after the SBW motor 21 is attached to the transmission case 11 using the bolt 132 and the bolt cover 133, the SBW motor 21 can be attached to the transmission case 11 with the fastening device 131 in only two steps, thereby making it possible to improve the workability of the fastening operation of the fastening device 131.

The facts that the convex engagement portions 133e are formed on the inner peripheral portion of the grip portion 133d of the bolt cover 133 to extend from the inner peripheral surface of the grip portion 133d toward the center of the grip portion 133d and that the head portion 132a of the bolt 132 has a flange portion 132f radially outwardly projecting to ensure that the flange portion 132f of the bolt 132 catches the convex engagement portions 133e when the flange portion 132f of the bolt 132 is moved toward the opening end 133a of the bolt cover 133 in the present embodiment result in that the bolt 132 can be prevented from coming off from the bolt cover 133, thereby making it possible to integrate the bolt 132 with the bolt cover 133.

According to the present embodiment, the bolt 132 and the bolt cover 133 can be integrated with each other, resulting from the fact that the convex engagement portions 133e are formed on the inner peripheral portion of the grip portion 133d of the bolt cover 133 to extend from the inner peripheral surface of the grip portion 133d toward the center of the grip portion 133d and that the head portion 132a of the bolt 132 has a flange portion 132f radially outwardly projecting. This makes it possible to adopt the assembling operation of the fastening device 131 in which the bolt 132 and the bolt cover 133 can independently be metal plated before being assembled with each other, and then the grip portion 133d of the bolt cover 133 is formed with the convex engagement portions 133e.

As previously mentioned, not only the bottom surface 132m of the flange portion 132f in opposing relation to the bottom portion 133c of the bolt cover 133 can be metal plated with a certainty, but also there is no need for such an operation of confirming whether or not the bottom surface 132m of the head portion 132a is metal plated in the state of the bolt 132 being integrated with the bolt cover 133.

According to the present embodiment, the entire surface of the bottom surface 132m of the flange portion 132f of the bolt 132 can be completely held in engagement with the bottom portion 133c of the bolt cover 133 in the state that the bolt 132 is screwed and secured to the transmission case 11 through the SBW motor 21, thereby making it possible to increase the contact area between the flange portion 132f of the bolt 132 and the bottom portion 133c of the bolt cover 133 to ensure the increased tightening force of the bolt 132.

As a consequence, the SBW motor 21 can firmly be attached to the transmission case 11 with the bolt 132 so that the operation to remove the bolt 132 is time-consuming, thereby making it possible to reduce not only a chance for the SBW motor 21 to be stolen but also a possibility of the vehicle being stolen by tampering the parking lock mechanism 20.

Third Embodiment

Figure 17:
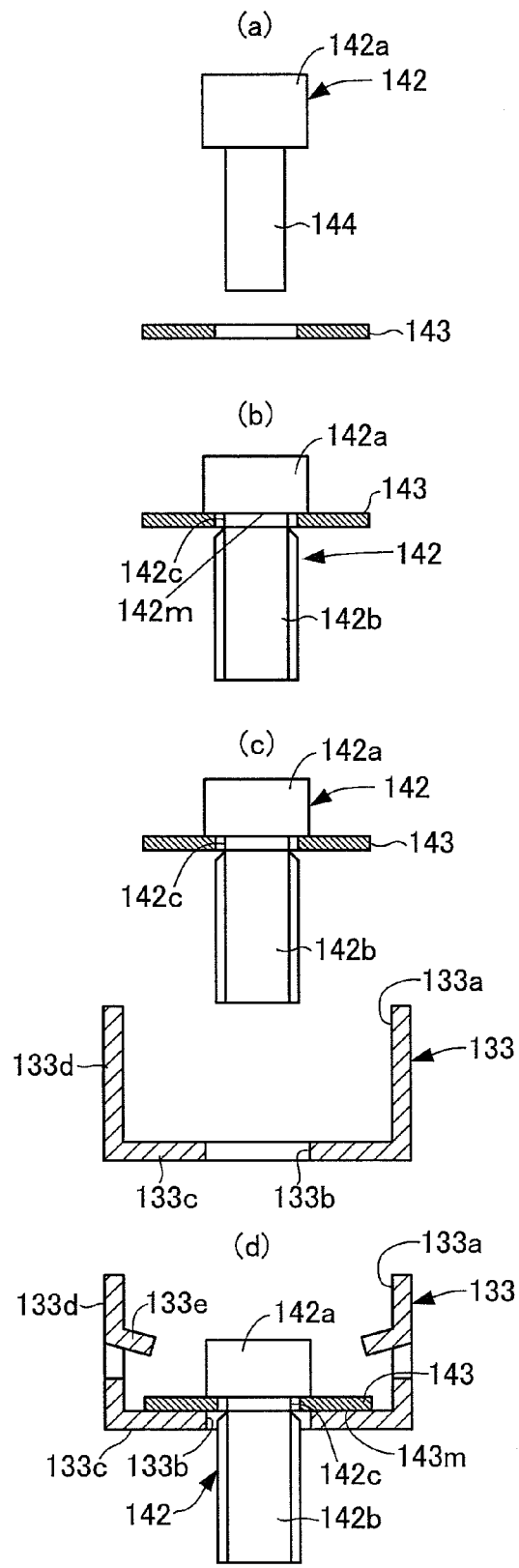
FIGS. 17(a) to 17(d) illustrate the fastening structure according to the third embodiment and are cross-sectional views of the fastening device showing procedure for assembling the fastening device to integrate a bolt cover with a bolt.
Figure 20:
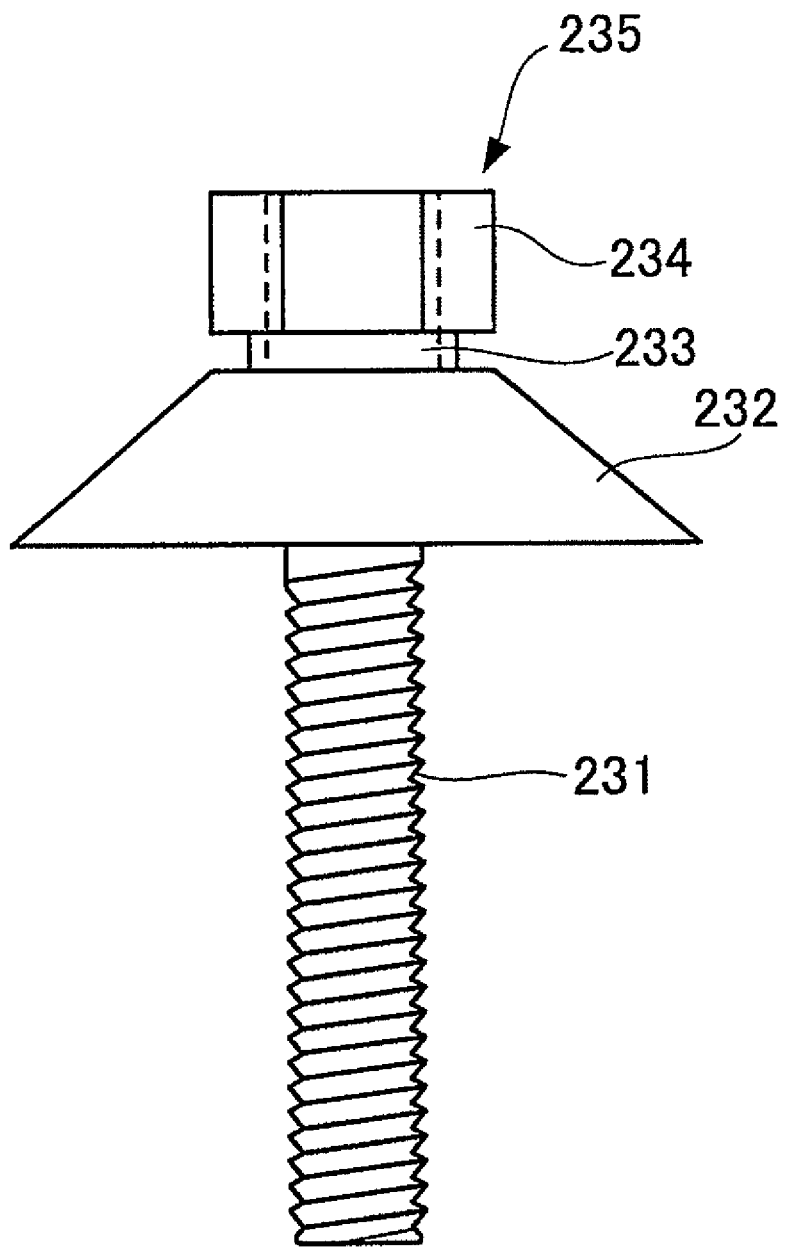
FIG. 20 is an outline view of a conventional bolt.

FIGS. 16 and 17 show a fastening structure according to a third embodiment of the present invention. The explanation of the third embodiment will be omitted with the elements and parts same as those of the second embodiment bearing the same reference numerals as those of the second embodiment. The construction of the power transmission apparatus will be explained with reference to the drawings the same as those of the first embodiment.

The fastening device 141 is shown in FIG. 16 to comprise a bolt 142 having a head portion 142a and a threaded portion 142b integrally formed with the head portion 142a, the bottomed tubular bolt cover 133 having the opening end 133a, and the cap member 134 for closing the opening end 133a of the bolt cover 133.

The head portion 142a of the bolt 142 has a fitting groove formed in a polygonal shape (female head) to be fitted with a wrench such as a hexagonal wrench so that the head portion 142a of the bolt 142 is rotated in clamping-down and removing directions with the wrench. The bolt 142 is constructed to be screwed into the threaded groove 11b of the transmission case 11.

The threaded portion 142b of the bolt 142 has an upper end formed with a small diameter portion 142c smaller in diameter than the threaded portion 142b. The small diameter portion 142c has a washer 143 received thereon, the washer 143 having an inner diameter smaller than the diameters of the head portion 142a and the threaded portion 142b. The washer 143 therefore catches the small diameter portion 142c and thus does not come off from the small diameter portion 142c. The above bolt 142 of the present embodiment is constituted by a washer bolt.

The radially outer end of the washer 143 extends radially outwardly of the radially inner ends of the convex engagement portion 133e, viz., the inner diameter defined by the ends of the convex engagement portions 133e being smaller than the outer diameter of the washer 143. This means that the washer 143 is caught on the convex engagement portions 133e when the bolt 142 is moved toward the opening end 133a of the bolt cover 133.

In other words, the fastening device 141 according to the present embodiment is constructed to prevent the bolt 142 from coming off from the bolt cover 133 with the washer 143 being caught on the convex engagement portions 133e. This means that the bolt 132 and the bolt cover 133 are integrated with each other.

The cap member 134 has an outer peripheral portion circumferentially formed with a plurality of concave engagement portions 134a to be engageable with the respective convex engagement portions 133e. This means that the cap member 134 is securely fixed to the bolt cover 133.

In the present embodiment, the cap member 134 is accommodated in the bolt cover 133 to have the concave engagement portions 134a engaged with the convex engagement portions 133e of the grip portion 133d, so that the cap member 134 is engaged with the bolt cover 133, thereby preventing the cap member 134 from being removed from the bolt cover 133. This means that the head portion 142a of the bolt 142 can be prevented from being rotated with a tool in a direction to remove the bolt 142.

The cap member 134 is constructed to be removed from the bolt cover 133 with the concave engagement portions 134a being disengaged from the convex engagement portions 133e when the inner surface of the cap member 134 is pushed by the bolt 142.

The method of assembling the fastening device 141 will be explained with reference to FIG. 17.

A blank bolt 142 having the threaded portion 142b with no thread before being rolled and threaded is firstly prepared (see FIG. 17(a)). Here, the threaded portion 142b with no thread is simply called a rod 144. The bolt cover 133, the bolt 142, and the washer 143 are respectively plated. The rod 144 is then passed through the washer 143 and the threaded portion 142b is formed by roll forming process (see FIG. 17(b)).

With the bolt 142 having the threaded portion 142b formed thereon, the threaded portion 142b of the bolt 142 is then passed through the through bore 133b of the bolt cover 133 (see FIG. 17(c)).

Thereafter, the parts of the grip portion 133d of the bolt cover 133 are bent inwardly of the grip portion 133d towards the center thereof so as to form the respective convex engagement portions 133e (see FIG. 17(d)).

According to the present embodiment, the bolt 142, the bolt cover 133, and the washer 143 are individually plated before the bolt 142 is assembled with the bolt cover 133 and the grip portion 133d of the bolt cover 133 are bent inwardly of the grip portion 133d to form the convex engagement portions 133e so that a bottom surface 142m of the head portion 142a in opposing relation to the bottom portion 133c of the bolt cover 133 via the washer 143 held between the bottom surface 142m of the head portion 142a and the bottom portion 133c of the bolt cover 133 can be plated with a certainty. Further, this makes it possible to produce the fastening device with no need for such an operation of confirming whether or not the bottom surface 142m of the head portion 142a is metal plated in the state of the bolt 142 being integrated with the bolt cover 133.

Next, the method of attaching the SBW motor 21 to the transmission case 11 after completing the maintenance operation of the SBW motor 21 will be explained hereinafter.

The operator firstly picks up the bolt 142 and the bolt cover 133 integrated with each other, and passes the threaded portion 142b of the bolt 142 through the through bore 41d of the bracket portion 41 of the SBW motor 21. Under this condition, the operator screws the threaded portion 142b of the bolt 142 into the threaded groove 11b of the transmission case 11 with the wrench.

Here, the bolt cover 133 and the bolt 142 are integrated with each other so that the through bore 133b of the bolt cover 133 can be positioned to the through bore 41d of the bracket portion 41 only by screwing the threaded portion 142b of the bolt 142 into the threaded groove 11b of the transmission case 11. It is therefore not required to position the through bore 133b of the bolt cover 133 with respect to the through bore 41d of the bracket portion 41.

At this time, the bottom portion 133c of the bolt cover 133 is positioned between a bottom surface 143m of the washer 143 and each of the fastening portions 41a, 41b and 41c of the bracket portion 41.

The cap member 134 is then accommodated in the bolt cover 133 to have the concave engagement portions 134a engaged with the convex engagement portions 133e of the grip portion 133d so that the cap member 134 is engaged with the bolt cover 133, thereby preventing the cap member 134 from being removed from the bolt cover 133. This means that the head portion 142a of the bolt 142 can be prevented from being rotated with a tool in a direction to remove the bolt 142.

On the other hand, it is assumed at the time of the parking lock mechanism 20 being locked that someone acts with an intention of stealing to release the lock of the parking lock mechanism 20 by removing the SBW motor 21 from the transmission case 11 to rotate the shaft 22a through the through bore 11a of the transmission case 11. At this time, it is impossible to rotate the head portion 142a of the bolt 142 since the head portion 142a of the bolt 142 is covered with the cap member 134. For this reason, the SBW motor 21 cannot be removed from the transmission case 11 and the lock of the parking lock mechanism 20 cannot be released either.

In the case that the SBW motor 21 is required to be removed from the transmission case 11 in order to carry out the maintenance operation of the SBW motor 21, the operation the same as that of the first embodiment is performed and thus will not be explained hereinafter. Also in the present embodiment, the operation to remove the bolt 142 is time-consuming, thereby making it possible to reduce not only a chance for the SBW motor 21 to be stolen but also a possibility of the vehicle being stolen by tampering the parking lock mechanism 20.

According to the present embodiment, the above bolt 142 of the present embodiment is constituted by a washer bolt, and the washer 143 engaged with the small diameter portion 142c formed on the upper end of the threaded portion 142a catches the convex engagement portions 133e formed on the grip portion 133d when the bolt 142 is moved toward the opening end 133a of the bolt cover 133, so that the bolt 142 can be prevented from coming off from the bolt cover 133, and thus the bolt 142 and the bolt cover 133 can be integrated with each other.

According to the present embodiment, the bolt cover 133 and the bolt 142 are individually plated before the bolt 142 is assembled with the bolt cover 133 and then the grip portion 133d of the bolt cover 133 is bent inwardly of the grip portion 133d to form the convex engagement portions 133e so that the bottom surface 142m of the head portion 142a in opposing relation to the bottom portion 133c of the bolt cover 133 via the washer 143 held between the bottom surface 142m of the head portion 142a and the bottom portion 133c of the bolt cover 133 can be plated with a certainty. Further, this makes it possible to produce the fastening device with no need for such an operation of confirming whether or not the bottom surface 142m of the head portion 142a is metal plated in the state of the bolt 142 being integrated with the bolt cover 133.

FIGS. 18 and 19 show a fastening structure of a third reference example. The power transmission apparatus will hereinafter be explained with reference to drawings utilized for explaining the first embodiment.

The fastening device 151 is shown in FIG. 18 to comprise a bolt 152 having a head portion 152a and a threaded portion 152b integrally formed with the head portion 152a, a bottomed tubular bolt cover 153 having an opening end 153a, and a cap member 154 for closing the opening end 153a of the bolt cover 153.

The head portion 152a of the bolt 152 has a fitting groove 152c in a polygonal shape (female head) formed along the axis of the head portion 152a to be fitted with a wrench such as a hexagonal wrench so that the head portion 152a of the bolt 152 can be rotated in clamping-down and removing directions with the wrench. When the head portion 152a of the bolt 152 is rotated in the clamping-down direction, the bolt 152 is screwed into the threaded groove 11b formed in the transmission case 11.

The bolt cover 153 is formed with a through bore 153b to have the threaded portion 152b of the bolt 152 pass through. The bolt cover 153 includes a bottom portion 153c held in contact with a bottom surface 152m of the head portion 152a of the bolt 152, and a grip portion 153d projecting from the outer peripheral portion of the bottom portion 153c to surround the head portion 152a of the bolt 152.

The lower end of the fitting groove 152c formed in the head portion 152a of the bolt 152 is connected with an annular groove 152d which serves as a first retaining engagement portion to prevent the cap member 154 from being removed. The annular groove 152d annularly projects radially outwardly of the fitting groove 152c.

The cap member 154 has a central lower end formed with a hollow cylindrical portion 154a projecting therefrom. The hollow cylindrical portion 154a has a lower end formed with an annular protrusion 154b projecting radially outwardly of the hollow cylindrical portion 154a and serving as a second retaining engagement portion.

The hollow cylindrical portion 154a is deformed radially inwardly when the hollow cylindrical portion 154a is inserted into the fitting groove 152c so that the annular protrusion 154b can easily be deformed and pass through the fitting groove 152c. When the annular protrusion 154b is moved to the annular groove 152d, the hollow cylindrical portion 154 is restored to its original shape to have the annular protrusion 154b engaged in retaining engagement with the annular groove 152d so that the cap member 154 cannot be removed from the head portion 152a of the bolt 152.

Next, the method of mounting the SBW motor 21 to the transmission case 11 after the completion of the maintenance operation of the SBW motor 21 will be hereinafter explained.

The operator firstly passes the threaded portion 152b of the bolt 152 through the through bore 41d of the bracket portion 41 of the SBW motor 21. Under this condition, the operator screws the threaded portion 152b of the bolt 152 into the threaded groove 11b of the transmission case 11 with the wrench.

At this time, the bottom portion 153c of the bolt cover 153 is positioned between the bottom surface 152m of the bolt 152 and each of the fastening portions 41a, 41b and 41c of the bracket portion 41.

The cap member 154 is then accommodated in the bolt cover 153 to have the annular protrusion 154b of the cap member 154 engage in retaining engagement with the annular groove 152d of the bolt 152, so that the cap member 154 is engaged with the bolt cover 153, thereby preventing the cap member 154 from being removed from the bolt cover 153. This means that the head portion 152a of the bolt 152 can be prevented from being rotated with a tool in a direction to remove the bolt 152.

On the other hand, it is assumed at the time of the parking lock mechanism 20 being locked that someone acts with an intention of stealing to release the lock of the parking lock mechanism 20 by removing the SBW motor 21 from the transmission case 11 to rotate the shaft 22a through the through bore 11a of the transmission case 11. At this time, it is impossible to rotate the head portion 152a of the bolt 152 since the head portion 152a of the bolt 152 is covered with the cap member 154. For this reason, the SBW motor 21 cannot be removed from the transmission case 11 and the lock of the parking lock mechanism 20 cannot be released either.

In the case that the SBW motor 21 is required to be removed from the transmission case 11 in order to carry out the maintenance operation of the SBW motor 21, the operation the same as that of the first embodiment is performed and thus will not be explained hereinafter.

In the third reference example, the annular protrusion 154b formed on the cap member 154 is engaged in retaining engagement with the annular groove 152d formed in the head portion 152a of the bolt 152 so that the cap member 154 cannot be removed from the head portion 152a of the bolt 152. This means that the bolt 152 and the cap member 154 can be securely engaged with each other by the annular groove 152d and the annular protrusion 154b.

Here, in the case that the parts of the grip portion 93d of the bolt cover 93 are inwardly bent to form the respective convex engagement portions 93e in such a way that the convex engagement portions 93e are punched as shown in FIG. 6, the parts of the grip portion 93d of the bolt cover 93 are formed with respective openings after the convex engagement portions 93e are punched. Accordingly, there is a possibility that the tongue portions 94b are pushed through the openings with a tool and released from the convex engagement portions 93e.

In the third reference example, the annular groove 152d and the annular protrusion 154b are formed on the head portion 152a of the bolt 152 and the cap member 154, respectively, both received in the bolt cover 153 so that the annular groove 152d and the annular protrusion 154b can neither be seen from the outside nor tampered with some tools from the outside. As a consequence, the cap member 154 cannot be removed from the bolt 152, and thus the bolt 152 can be protected by the cap member 154.

This makes it possible that the construction corresponding to the annular groove 152d and the annular protrusion 154b is not required to be formed on the grip portion 153d of the bolt cover 153. For example, the punching process of the grip portion 153d to make the bent portions corresponding to the convex engagement portions 93e (see FIG. 6) can be omitted.

For this reason, the operation to remove the cap member 154 from the bolt cover 153 with a tool inserted into the grip portion 153d through the openings formed by punching and bending the parts of the grip portion 153d can be excluded completely. As a consequence, the cap member 154 cannot be removed from the bolt 152, and thus the bolt 152 can be protected by the cap member 154.

It requires ample time to complete the removal operation to remove the bolt 152 from the transmission case 11, and thus it can discourage a thief to continue the removal operation. In addition to difficulties in the theft of the SBW motor 21, the power transmission apparatus 10 according to the present embodiment can further reduce a possibility of having the vehicle stolen by tampering the parking lock mechanism 20 to a level as small as possible.

Although the third reference example has been explained with an example concerning the first retaining engagement portion formed at the lower end of the fitting groove 152c in the head portion 152a of the bolt 152, the present invention is not limited to the above example. As shown in FIG. 19, the first retaining engagement portion may be formed on the side surface of the head portion 152a of the bolt 152 according to the present invention.

In FIG. 19, the annular groove 152e serving as the first retaining engagement portion is formed on the side surface of the head portion 152a of the bolt 152 in the circumferential direction of the head portion 152a. The cap member 155 has a central lower end formed with a hollow cylindrical portion 155a projecting therefrom. The hollow cylindrical portion 155a has a lower end formed with an annular protrusion 155b projecting radially inwardly of the hollow cylindrical portion 155a and serving as a second retaining engagement portion.

The hollow cylindrical portion 155a is deformed radially outwardly with the annular protrusion 155b being engaged with the side surface of the head portion 152a of the bolt 152 when the hollow cylindrical portion 155a is coupled with the head portion 152a. When the annular protrusion 155b is moved to the annular groove 155e, the hollow cylindrical portion 155a is restored to its original shape to have the annular protrusion 155b engaged in retaining engagement with the annular groove 152e so that the cap member 155 cannot be removed from the head portion 152a of the bolt 152.

The fact that the annular protrusion 155b formed on the cap member 155 is engaged in retaining engagement with the annular groove 152e formed on the side surface of the head portion 152a of the bolt 152 makes it possible to securely fix the cap member 155 to the bolt 152 by the annular protrusion 155b and the annular groove 152e, similar to the third reference example, thereby preventing the cap member 155 from being removed from the bolt 152.

While the previously mentioned embodiments have been explained with examples concerning the fastening devices which are used for securing the SBW motor 21 to the transmission case 11 to prevent the vehicle from being stolen, the present invention is not limited to the above examples. The fastening devices according to the present invention may be employed for other objects that need to be prevented from being stolen. For example, the other objects are raised to be employed for the vehicle and include a fastening device used for preventing a theft of a spare tire. This fastening device is constructed to fasten a spare tire carrier serving as an attaching member for holding a spare tire to a vehicle body serving as an attached member. Other than the above fastening device, there are raised two examples which include a steering lock fastening device and a hood lock fastening device. The steering lock fastening device as an attaching member is constructed to secure a steering wheel to an attached member, while the hood lock fastening device as an attaching member is constructed to secure a hood to an attached member.

The fastening devices other than the above-described fastening devices used for the vehicle include an anti-theft parking meter fastening device for fastening a parking meter as an attaching member to an attached member, and an anti-theft vending machine fastening device for fastening an automatically operated vending machine as an attaching member to an attached member. These fastening devices are used to prevent the parking meter and the vending machine from being stolen.

The fastening devices according to the present invention are difficult to remove but can be removed with a certainty even though the removing operation is time-consuming and are therefore useful as fastening devices that can provide both anti-theft function to prevent attaching and attached objects fastened from being stolen and ease of maintenance thereof.

In the case that the attaching member is attached to the attached member that is an object other than the vehicle by the fastening device with an ordinary bolt having such as a hexagonal groove and the attached member is mounted on a body, the opening end of the bolt cover only has to be positioned in close proximity to a peripheral member arranged on the body around the attached member.

The fact that the opening end of the bolt cover is positioned in close proximity to the peripheral member arranged around the attached member when the attached member is mounted on the body makes it impossible to secure a working space to insert a tool therein between the opening end of the bolt cover and the peripheral member. Therefore, with even an inexpensive bolt being used for the fastening device, it can serve to prevent the bolt from being rotated in a direction to remove the bolt from the attaching and attached members.

The fastening device thus constructed can be removed from the attached member in a wide working space with ample time after the attached member is removed from the body, thereby making it possible to perform the maintenance operation of the attaching member with a certainty.

The previously mentioned embodiments have been raised solely as examples to explain the present invention. However, the present invention is not limited to these examples. The scope of the present invention should be construed based on the claims and cover various modifications and equivalents within the scope defined in the claims.

As understood from the foregoing description, the fastening structures according to the present invention are advantageous in that the bolt of the fastening device can be removed with a certainty although the removing operation is difficult to be performed in a narrow working space and requires ample time, and in that the above fastening device can provide both anti-theft function to prevent attaching and attached objects fastened from being stolen and ease of maintenance thereof. The present invention is useful as the fastening structure, the method for assembling the fastening device, and the power transmission apparatus for fastening the attaching member to the attached member utilizing the fastening device.

what is claimed is:

1. A fastening device for fastening an attaching member to an attached member, the fastening device comprising:
a bolt having a head portion and a threaded portion integrally formed with the head portion, a bottomed tubular bolt cover integrated with the bolt and having an opening end, and a cap member accommodated in the bolt cover, closing the opening end of the bolt cover and having a first engagement portion formed thereon,
the bolt cover has a through bore configured to have the threaded portion of the bolt pass through, a bottom portion abutting on a bottom surface of the head portion of the bolt, and a grip portion projecting from an outer circumference of the bottom portion, surrounding a periphery of the head portion of the bolt, and having a second engagement portion configured to engage with the first engagement portion and formed on an inner peripheral portion thereof,
the second engagement portion is constituted by a protrusion inwardly projecting from the inner peripheral portion of the grip portion of the bolt cover, the bolt is constituted by a washer bolt provided with a small diameter portion formed on an upper end of the threaded portion thereof and a washer received and retained on the small diameter portion, a distance between an outer diameter of the washer and the inner peripheral portion of the grip portion is smaller than a distance between an inner distal end of the protrusion and the inner peripheral portion of the grip portion, such that the washer is made to catch the second engagement portion as the bolt is moved towards the opening end of the bolt cover, and the bottom portion of the bolt cover is interposed between the bottom surface of the head portion of the bolt and the attaching member in a state that the attaching member is fastened to the attached member via the fastening device.

* * * * *